United States Patent [19]
Abbondanti

[11] Patent Number: 4,577,269
[45] Date of Patent: Mar. 18, 1986

[54] APPARATUS FOR EFFICIENT USE OF A MICROPROCESSOR TO CONTROL THYRISTORS

[75] Inventor: Alberto Abbondanti, Penn Hills, Pa.

[73] Assignee: Westinghouse Electric Corp., Pittsburgh, Pa.

[21] Appl. No.: 435,440

[22] Filed: Oct. 20, 1982

[51] Int. Cl.$^4$ .......................................... H02M 1/084
[52] U.S. Cl. .............................. 363/129; 318/345 C; 318/345 E
[58] Field of Search ........... 307/252 N, 252 P, 252 Q; 363/87, 129; 318/341, 345 C, 345 E

[56] References Cited

U.S. PATENT DOCUMENTS

| | | | |
|---|---|---|---|
| 4,017,744 | 4/1977 | Johnson | 307/252 Q |
| 4,028,609 | 6/1977 | Detering | 321/5 |
| 4,173,722 | 11/1979 | Detering | 307/252 Q |
| 4,201,936 | 5/1980 | Roumanis | 318/341 |
| 4,337,429 | 6/1982 | Stuart | 318/811 |
| 4,347,562 | 8/1982 | Galloway | 363/129 |
| 4,409,534 | 10/1983 | Bose | 318/345 E |
| 4,423,458 | 12/1983 | Stich | 361/87 |
| 4,427,933 | 1/1984 | Wagener et al. | 318/345 E |
| 4,456,871 | 6/1984 | Stich | 307/252 N |

OTHER PUBLICATIONS

Bose, Bimal K.; Adjustable Speed A.C. Drives-A Technology Status Review; IEEE, vol. #70, No. 2, Feb. '82, pp. 116-135.

Primary Examiner—William H. Beha, Jr.
Assistant Examiner—Jeffrey Sterrett
Attorney, Agent, or Firm—C. M. Lorin

[57] ABSTRACT

A microprocessor-based solid state AC-DC converter system makes use of the microprocessor facility to implement sequential thyristor firing at selected delay angles. A first timer at the AC line fundamental frequency supplies to the microprocessor a numerical master ramp count, from which individual ramp counts are calculated which relate to the individual thyristors to be fired in sequence. From such an individual ramp count by comparison with a delay angle reference count the microprocessor calculates the number of units of time needed until zero count on the individual ramp. A second timer is preset at an initial count value equal to such calculated number of units of time and the second timer is run to count-down. The thyristor next to be fired is triggered when zero count occurs.

4 Claims, 14 Drawing Figures

APPARATUS FOR EFFICIENT USE OF A MICROPROCESSOR TO CONTROL THYRISTORS

BACKGROUND OF THE INVENTION

The present invention relates to gating control systems for an array of thyristors in general, and more particularly to static controlled converter systems embodying such a gating control system.

Firing of thyristors in a polyphase converter system involves sequential selection of a thyristor to be fired, and proper timing with respect to the applied AC power supply, in order to establish a firing delay angle which determines a predetermined converter system output.

The firing of thyristors is caused by a pulse generator outputting a hard pulse triggered in accordance with both a signal reference which is representative of the intended delay angle and a time signal which is representative of the electrical angle on the fundamental wave of the AC power supply.

It is known to use digital techniques for the generation, in relation to the fundamental AC supply voltage, of a time wave reference and for the logic selection of the thyristor "next" to be fired. See for instance U.S. Pat. Nos. 4,017,744 of F. O. Johnson and 4,173,722 of R. L. Detering. The prior art, however, uses hardwired logic as opposed to numerical techniques for the generation of the time wave reference signal, which may be digital or analog in nature, and for the comparison between time wave reference signal and delay angle reference signal, the latter which may also be either analog or digital in nature.

With the advent of microprocessing, solid state motor drives have evolved in which a microprocessor is at the center of the system regulation and control. See for instance "Adjustable Speed AC Drives-A Technology Status Review" by Bimal K. Bose IEEE Proceedings Vol. 70, No. 2, February 1982, pp. 116-135.

SUMMARY OF THE INVENTION

The present invention resides in method and apparatus for the determination of the delay angle in a thyristor pulse generator and for the controlled firing of thyristors in a polyphase static converter system with such method and/or apparatus.

While the use of microprocessing techniques in a solid state motor drive is known, the present invention takes advantage of the availability of a microprocessor in such a motor drive to effect thyristor control accessorily with the other microprocessor control operations in the motor drive, in contrast to multi-microprocessor control.

The gating control system according to the invention triggers the firing of the thyristors of an array hooked upon the AC power supply in accordance with a countdown effected from a preset value calculated by a microprocessor and defining by anticipation the time interval running until the firing event. The calculation is performed in relation to a master counter synchronized with the fundamental AC power wave and to individual numerical ramps derived therefrom in relation to each thyristor-related AC phase line. The microprocessor main tasks are interrupted after thyristor firing to allow calculation and counter presetting for a given delay angle regarding the thyristor "next" to be fired.

DETAILED DESCRIPTION OF THE PREFERRED EMBODIMENT OF THE INVENTION

Figure 1:
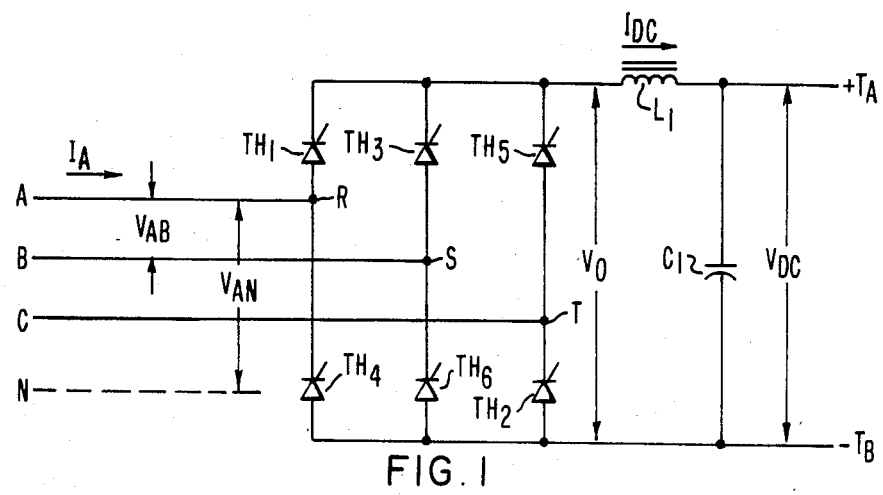
FIG. 1 is a six-pulse 3-phase AC/DC converter as can be used with the gating control system according to the invention.

Referring to FIG. 1, a bridge comprised of six-thyristors $TH_1$–$TH_6$ is connected between DC output terminals $+T_A$, $-T_B$ such that nodal points R, S, T between pairs of thyristors ($TH_1$, $TH_4$), ($TH_3$, $TH_6$), ($TH_5$, $TH_2$) respond to phase lines A, B, C of a three-phase AC power supply. For instance, phase A is at a voltage $V_{AN}$ to neutral and there is an interphase voltage $V_{AB}$ between phases A and B. The output of the bridge is $V_O$, which includes a ripple due to the phase succession and the notch caused by the delay angle. The DC output is $V_{DC}$ beyond the filtering combination of a series combination of an inductance $L_1$ and a parallel capacitor $C_1$. The output current is $I_{DC}$.

Figure 2A:
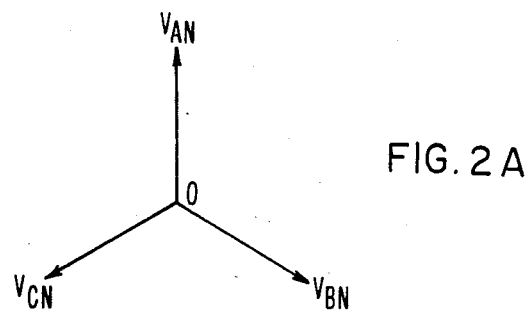
FIGS. 2A and 2B are vectorial representations of the phase-to-neutral and the interphase voltages of the bridge of FIG. 1.
Figure 2B:
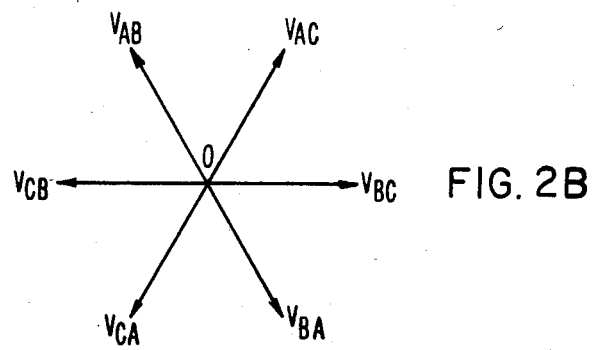
Figure 3:
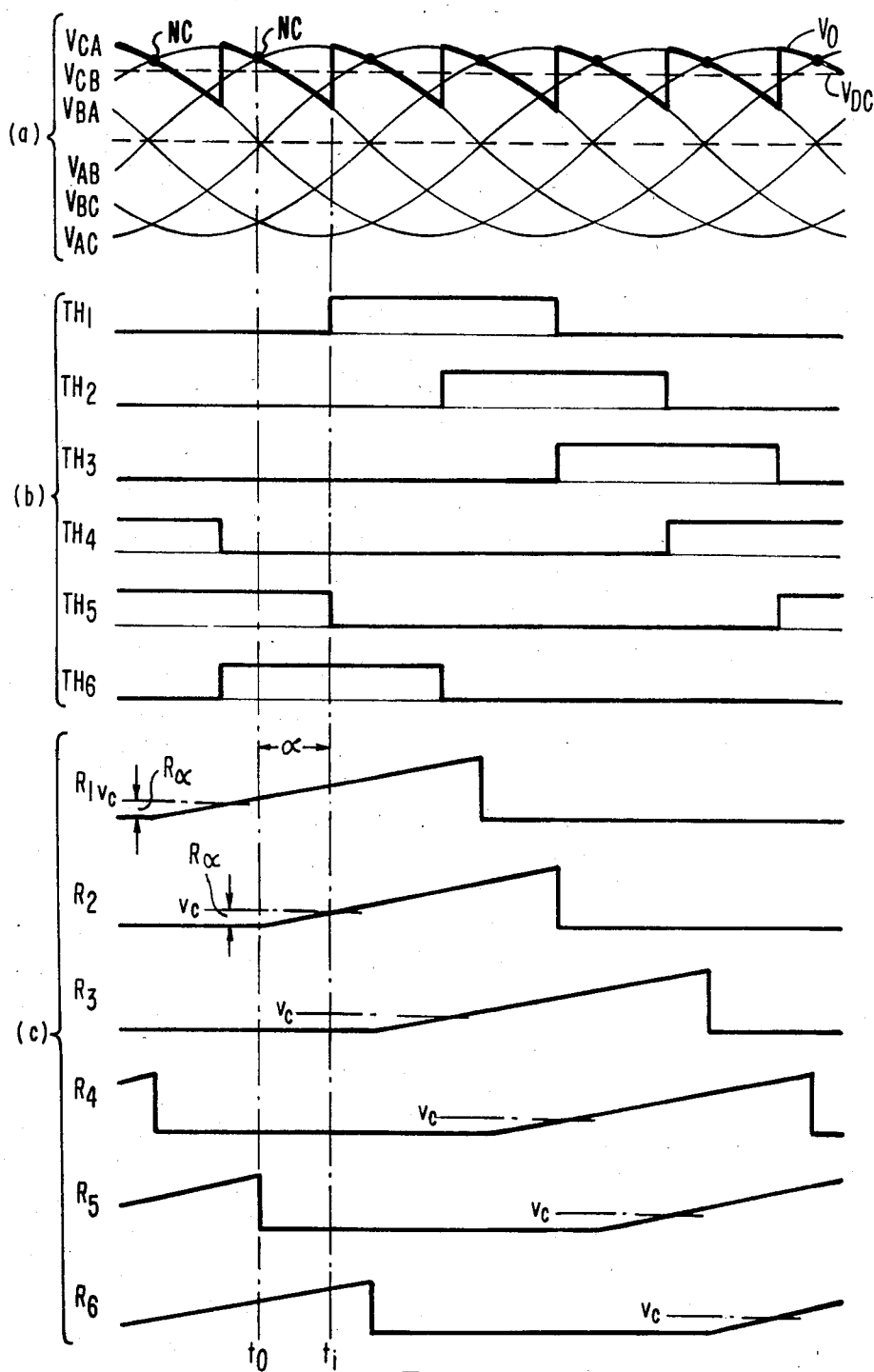
FIG. 3 shows with curves delay angle control of the thyristors of FIG. 1 by the ramp interception method according to the prior art.

Curves $V_{AB}$, $V_{CB}$ and $V_{AC}$ under (a) in FIG. 3 are the interphase voltages at the input of the converter bridge. The vectorial relation is shown in FIGS. 2A, 2B. The phase-to-neutral voltages $V_{AN}$, $V_{BN}$, $V_{CN}$ are, clockwise, successive vectors at 120° to one another. The interphase voltages $V_{AB}$, $V_{AC}$, $V_{BC}$, $V_{BA}$, $V_{CA}$ and $V_{CB}$ are, clockwise, successive vectors at 60° to one another. The corresponding curves are shown in succession under (a) in FIG. 3. When thyristors $TH_1$ and $TH_6$ are concurrently conductive, the voltage $V_o$ indicated in solid line appears between phases A and B, e.g. under voltage $V_{AB}$. This situation is illustrated by curves (b) which indicate the periods of conduction of thyristor $TH_1$–$TH_6$. NC are the intersecting points between successive curves $V_{AB}$, $V_{AC}$, $V_{BC}$ which are the natural commutation points, e.g. for zero delay angle.

When the operative point is on curve $V_{CB}$, for instance, while thyristors $TH_5$ and $TH_6$ are conductive, at terminals $+T_A$, $-T_B$ appears a voltage $V_o$ derived from nodes S and T. Thus, $V_o = V_{CB}$. If firing of thyristor $TH_1$ is delayed by an angle $\alpha$, as shown in FIG. 3, the operative point goes beyond natural commutation point NC, following the solid line there beyond. When $TH_1$ is fired, it commutates thyristor $TH_5$ OFF, and output terminals $+T_A$, $-T_B$ are now drawing from nodal points R and S, whereby $V_o$ has become $V_{AB}$ while thyristors $TH_1$ and $TH_6$ are concurrently conducting. The average of $V_o$ is $V_{DC}$ outputted by filter $L_1C_1$, as shown in dotted line. The maximum value of the output voltage $V_{DC}$ occurs for $\alpha=0$, e.g. when the firing instant $t_f$ is coinciding with the natural commutation time instant $t_o$, from one thyristor to the next. The amplitude of delay angle $\alpha$ depends upon the size of a reference signal $v_c$ which defines the intersection with a time wave reference which may be a cosine wave when using the cosine wave crossing control principle (B. R. Pelly "Thyristor Phase-Controlled Converters and Cycle Converter" chapter 10, p. 249), or a ramp, as illustrated by curves (c) of FIG. 3. The ramps ($R_1-R_6$) of FIG. 3 define a range of 180° for angle $\alpha$, each ramp being at 60° to the next.

In the known analog implementation of the ramp interception method, the natural commutation points NC are detected via a zero-crossing detector circuit and each analog ramp is started in coincidence with such NC point. The ramp is reset after 180° electrical degrees. A common reference level $R_{,\alpha}$ defined by the reference signal $v_c$ representative of the desired delay angle, is established on the ramp by comparison. The corresponding thyristor is gated upon such interception and typically maintained in conduction for 120°. End stops are implemented by applying a lower and upper limit to the range of variation of $v_c$. See for instance U.S. Pat. No. 4,028,609 of R. L. Detering.

It is known to generate with a digital counter a discrete time representation of the electrical degrees running along the fundamental wave, and to logically derive therefrom successive digital ramps affected to the respective thyristors to be fired in succession. Each individual ramp is converted to an analog ramp for comparison purpose with the delay angle reference signal $v_c$. See for instance U.S. Pat. Nos. 4,017,744 of F. O. Johnson and 4,028,609 of R. L. Detering.

It is now proposed to implement both the ramp generating function and the signal comparison function with the assist of a microprocessor. For such implementation the time reference interception method must be performed with numerical means, e.g., the signals converted to numbers are to be processed via arithmetic, logical and relational operations by the registers inside the processor. The first approach conceivable is to duplicate each of the steps known in the analog approach of the prior art and perform them by numerical means via a microprocessor. Ramps will be reproduced by periodically incrementing data memory locations. The reference signal $v_c$ will be digitized and the comparison performed digitally for each ramp. The state of one of the six output lines at a selected port will be changed once the interception has been detected, thereby causing a corresponding thyristor to be gated.

This approach, however, is objectionable and impractical for two reasons:

First, the processor must be continuously busy keeping track to check whether the interception has been reached. Since the variations of the controlling signal $v_c$ are unpredictable, the intersecting point $R_\alpha$ must be tracked constantly and the processor has to remain on a standby to initiate gating almost at any moment, while comparisons between a ramp and $R_\alpha$ are being performed routinely, most of the time. Therefore, the processor is unavailable for other tasks requiring processor use.

Another problem lies in the fact that performing a comparison involves the performance of many processor instructions. This is time consuming. The time it takes determines the resolution within which the delay angle is ascertained. Unless a very fast processor is called for, the achievable resolution is unsatisfactory for many applications in practice.

For these reasons a mere numerical transposition of the analog "ramp interception" gating method is not used. Instead, microprocessor-based gating approaches encountered in the prior art burden the system with hardware such as counters, registers, gates, flip-flops, ... which are provided externally of the microcomputer in order to implement the gating function under proper supervision by the microprocessor. It is highly desirable to eliminate such hardware.

Figure 4:
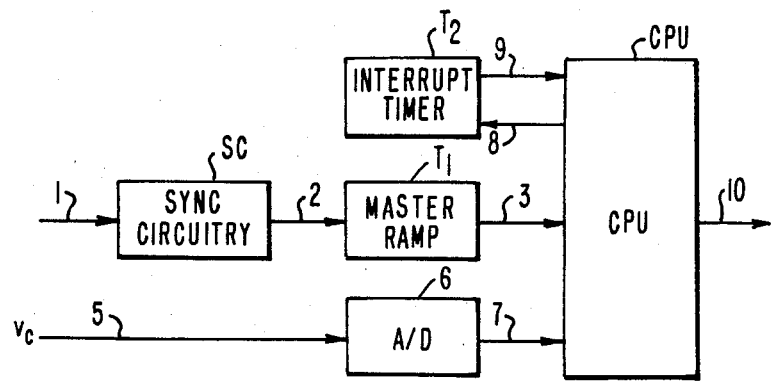
FIG. 4 is a block diagram of the firing control system according to the invention.
Figure 5:
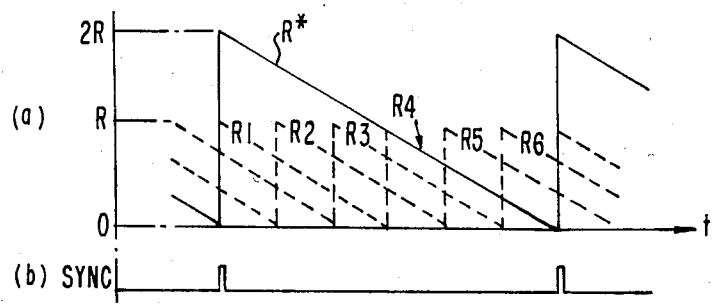
FIG. 5 shows the master ramp and the auxiliary ramps derived therefrom by microprocessing according to the invention in the illustrative situation of FIG. 1.

FIG. 4 is a block diagram illustrating the operation of the microprocessor in terms of the SYNC signal, the delay angle signal reference $v_c$ and the firing sequence to the driven circuits of the thyristors. The central processing unit involves a microprocessor including program memory and data memory. A first timer $T_1$ in the form of a down-counter is programmed to be reset to an initial count upon each occurrence of a SYNC pulse and to proceed with a count-down between consecutive SYNC pulses. The initial count of $T_1$ is set via software to be such that the timer reaches the terminal count, i.e. zero, at the instant the reset SYNC pulse is generated. Thus, the contents of timer $T_1$ can be represented by a descending ramp $R^*$ as shown in FIG. 5. The SYNC pulse is derived on line 2 from a SYNC circuit SC responsive to the line voltage on line 1. The SYNC circuit detects the zero-crossings of the line voltage and generates a pulse on each such occurrence, as shown in the afore-mentioned Johnson and Detering patents. The SYNC pulse is coincident with one of the six NC points of FIG. 3, and thus exhibits the same periodicity as one of the AC lines (typically 60 Hz). The delay angle $\alpha$ is determined by a reference voltage signal $v_c$ appearing on line 5. Such voltage signal is converted into a binary signal by an analog-to-digital converter 6. The binary value $R_\alpha$ is supplied via line 7 to the CPU.

The CPU periodically reads the value of $R^*$ on the master ramp from line 3. Through simple arithmetic operations such readings are converted by the CPU so as to indicate counts on six secondary ramps $R_1-R_6$ of same slope and same initial maximum count. These ramps which are shifted each by 1/6 of the period of the master ramp, e.g. 1/6 of the time interval between two consecutive SYNC pulses. The delay angle $\alpha$ is counted from the front edge of each secondary ramp, e.g. from one of the NC points such as shown on FIG. 3, until the count has become equal to $R_\alpha$, the reference value.

Expressing the parallel translation from the master ramp, for the respective ramps $R_1-R_6$, each reading $R^*$ on the master ramp appears on the respective secondary ramps reduced by a quantity k, 2k, ... 6k, where k is 1/6 the difference between the initial count on the master ramp and the initial count on the secondary ramp at zero delay angle.

Referring to FIG. 5, for reasons of simplicity, k is chosen to be equal to half the initial count of the master ramp. If the initial count of each secondary ramp is R, $6k=2R$. The CPU periodically reads the value of R* on the master ramp. Timer $T_1$ is programmed so as to reset the master ramp to the initial count 2R upon each occurrence of the SYNC pulse, and to count down between SYNC pulses. The initial count of $T_1$ is set via software to be such that the terminal count-zero is reached at the instant of the next SYNC pulse. Therefore, on line 3 of FIG. 4, a descending master ramp appears as shown in FIG. 5.

For the secondary ramps $R_1$–$R_6$, if the initial count is $R=\frac{1}{2} R^*$, the instantaneous count on a secondary ramp is given by the following relations:
 (1) $R_1=R^*-R$
 (2) $R_2=R^*-(\frac{2}{3})R$
 (3) $R_3=R^*-R/3$
 (4) $R_4=R^*$
 (5) $R_5=R^*+R/3$, when $R_5$ is smaller than R
 (6) $R_5=R^*-(5/3)R$, when $R_5$ is larger than R
 (7) $R_6=R^*+(\frac{2}{3})R$, when $R_6$ is smaller than R
 (8) $R_6=R^*-(4/3)R$, when $R_6$ is larger than R.

The CPU reads the value of R* from line 3 and performs the above transformations, thereby defining an operative point on one of the six secondary ramps. The CPU also reads from line 7 the numerical value of reference $R_\alpha$ defining the delay angle. This value is in fact stored in memory as a result from regulation algorithms performed under the controlled process. According to the present invention, the operative point at a given instant on a given ramp $R_1 \ldots R_6$, e.g. for a thyristor next to be fired, is used as a count which is compared with $R_\alpha$ by the CPU in order to ascertain how far in the future is the gating instant for the particular thyristor, and such future gating instant is instantaneously projected as a count in a second timer $T_2$ which, so loaded, will count down and reach a terminal count exactly at the projected gating instant.

Thus, the operation of timer $T_2$ of FIG. 4 is programmed by the CPU so that a count calculated on the basis of the set of relations (1) to (8) and on the basis of $T_2=R_N-R_\alpha$ is loaded, by line 8, as an initial count into $T_2$. The count-down by $T_2$ is initiated immediately after loading. Count-down proceeds at a known decrementing clock rate which matches the master ramp decrementing rate. After loading $T_2$, the CPU terminates its gating activity and returns to other tasks. When counter $T_2$ reaches its terminal count, it causes by line 9 a signal interrupt I to force the CPU to interrupt its other tasks and implement gating, by changing the state of the bits at the exit port, so that the proper thyristor is gated.

It is observed that in the process of reading R* on the master ramp, of comparing at a given instant the count which is indicative of the operative point on the selected ramp $R_1 \ldots$ or $R_6$, of calculating a preset value for timer $T_2$, loading timer $T_2$, counting down such preset value and sending an interrupt command to the CPU in order to cause a triggering pulse to be applied to the thyristor driver circuit, several dead times have to be accounted for. These amount to offsetting the down-counter $T_2$ by as much as to cause the occurrence of the firing pulse in real time at the anticipated instant for such event. This is a programming technique which is illustrated herein in the Appendix, by reference to FIG. 13.

Figure 6:
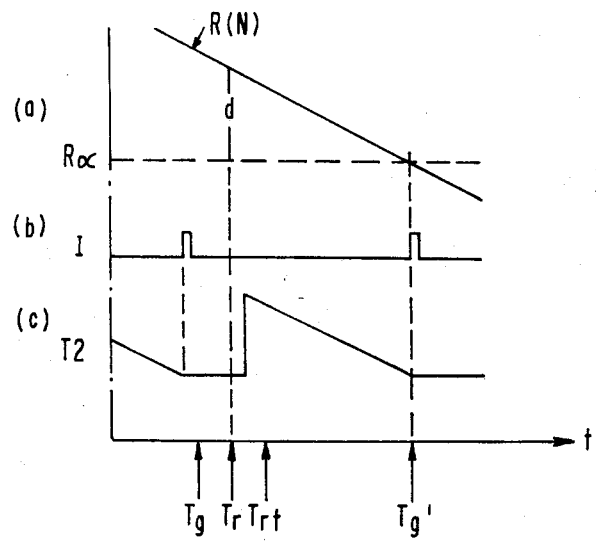
FIG. 6 illustrates with curves the time relationship between the counts, microprocessor interrupts and gating instants in the firing control system of FIG. 4.

Referring to curve (a) of FIG. 6, one secondary ramp is shown with the prospective gating instant $T_g'$ corresponding to $R_\alpha$ on the ramp. Curve (c) shows down counting of timer $T_2$. The latter reaches zero at an instant for which curve (b) shows an interrupt pulse I. As a result of such recognition earlier by the CPU, gating of a preceding thyristor occurred at the gating instant $T_g$. Following gating of such thyristor, the CPU effects at instant $T_r$ a reading R(N) of the ramp, and calculates the difference d between such reading R(N) and $R_\alpha$ (line 7). Actually, the CPU calculates a function of the difference, typically d minus a constant. Immediately, via line 8, such count derived from d is loaded into the timer $T_2$, namely at instant $T_{rt}$. This is also the end of the gating activity of the CPU until instant $T_g'$, the future gating instant. Indeed, $T_g'$ is determined, like earlier instant $T_g$, by the terminal count of counter $T_2$.

It appears that, with this approach, the CPU is active with the gating function only for short intervals immediately before and after gating, six times per AC wave period. Accordingly, the CPU remains available for other tasks most of the time between gatings. It also appears that hardware peripheral to the microprocessor is limited to timers. For instance, when using INTEL processors, a timer peripheral, known as INTEL 8253, can be used which is a chip containing three 16-bit down-counters, of which two can serve as timers $T_1$ and $T_2$ of FIG. 4. The counters can be read at any moment by the microprocessor. They can be triggered by external signals and they generate external signals upon the occurrence of a terminal count. They are clocked externally by the same clock as the CPU, or a submultiple thereof. Other manufacturers than INTEL Corporation provide similar chips on the open market. Each timer is a register, typically 16-bit wide, the binary contents of which are decremented by one at each clock period. Line 10 of FIG. 4 indicates a port providing six lines energizing the gates of the six thyristors via gate drive amplifiers, as generally known.

It is observed that the resolution with which the delay angle $\alpha$ is determined is independent from microprocessor instructions execution time. It depends only upon the number of bits in timer $T_1$ and timer $T_2$ registers, and upon the clock rate. Typical values, in this regard, are 16 bits and 2 MHz. This makes it easy to achieve delay angle accuracies and resolutions better than $\frac{1}{4}$ degree, even with relatively slow processors.

Gating implementation is achieved with no hardware peripheral to the microcomputer system other than a programmable interval timer which is standard with most microcomputer boards. Moreover, the processor uses a small fraction of its time, about 15%, in carrying out the gating function. This leaves plenty of time for the other tasks, such as current or voltage servo-regulation and the power converter supervisory functions.

Figure 7:
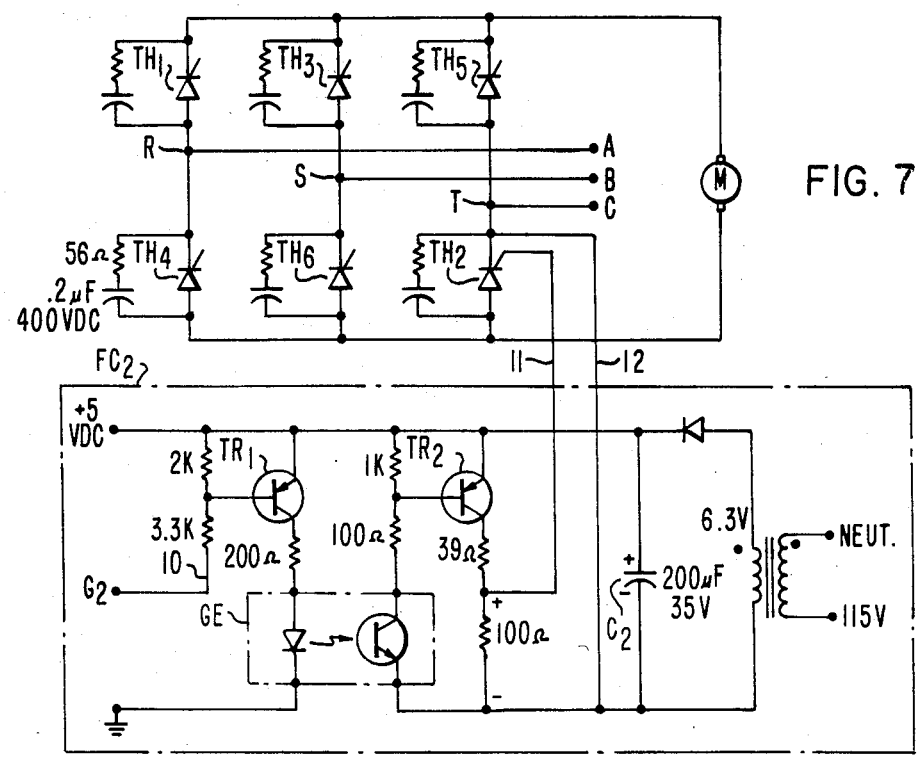
FIG. 7 is a firing circuitry as can be used for the firing circuits associated with the thyristors of FIG. 1 and the block diagram of FIG. 4.

The implementation of the firing circuitry is illustrated in FIG. 7. The six-thyristor bridge of FIG. 1 is, there; shown with one of the six firing circuits $FC_2$ associated with thyristor $TH_2$. Line 10 (which is one of six lines, in FIG. 4, at the output of the CPU) receives a gating pulse $G_2$ causing transistor $TR_1$ to be conductive. This causes in turn, via optico-coupler GE, transistor $TR_2$ to be conductive, thereby discharging capacitor $C_2$ between lines 11 and 12 on the gating terminals of thyristor $TH_2$. The circuitry shown is conventional.

Figure 8:
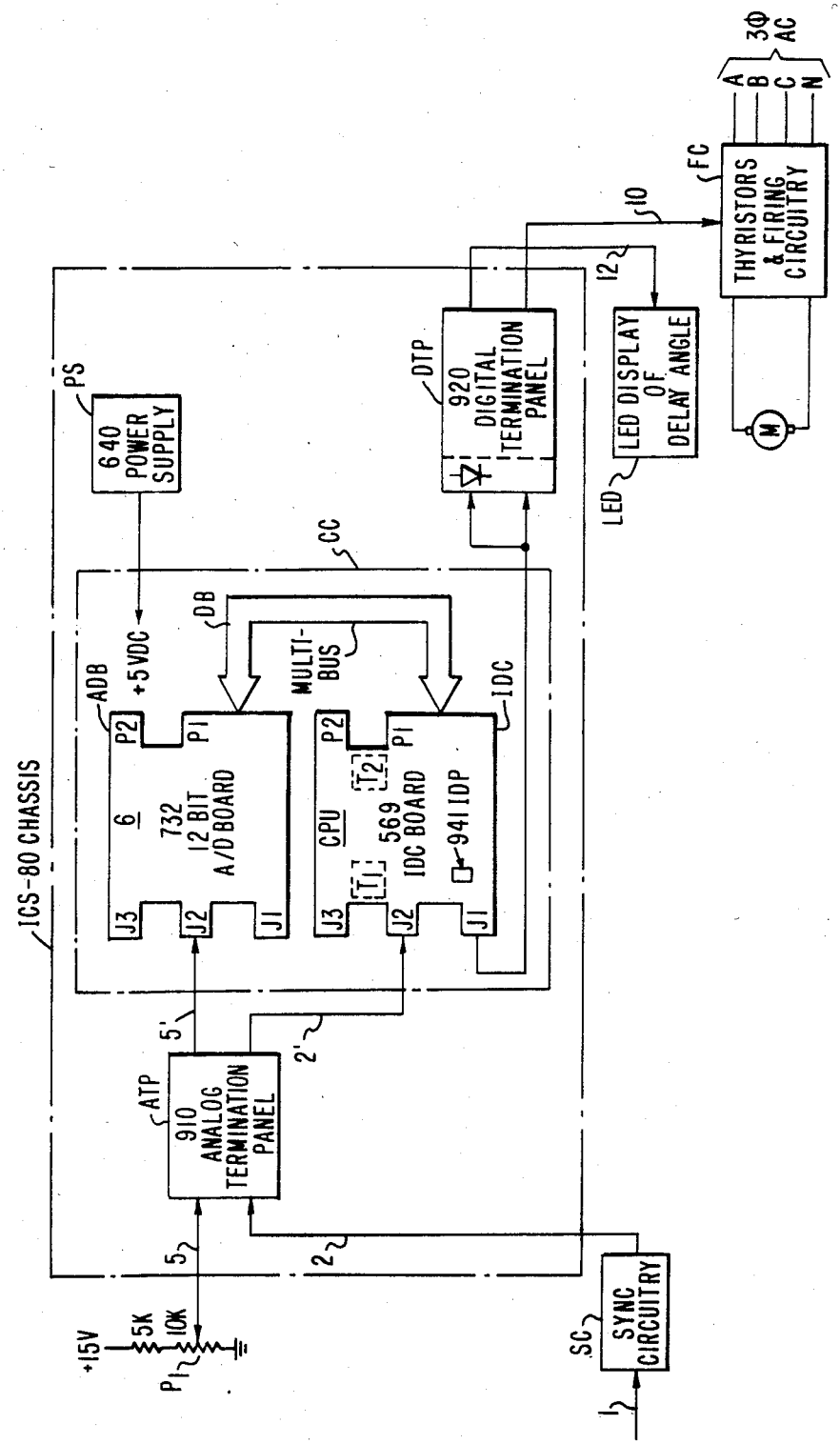
FIG. 8 is a functional block diagram of the hardware that can be used with the microprocessor of FIG. 4.

Referring to FIG. 8, a functional block diagram illustrates the implementation of the circuit of FIG. 4 on an INTEL ICS-80 chassis. This implementation is based on a standard three-phase bridge AC/DC converter used in the rectification mode to drive a DC motor M. The selected microprocessor hardware is taken from the Industrial Control Series (ICS) of Intel Corporation, which includes an ICS-80 chassis with a 640 Power Supply (PS) and a 614 Card Cage (CC). The digital circuitry is selected from the Single Board Computer Series (ISBC) of Intel, including a 569 Intelligent Digital Controller Board (IDC), containing an 8085 CPU and two external timers $T_1$, $T_2$, which performs all the calculations, and a 732 Combination Analog Input/Output Board (ADB) which performs the required A/D conversions.

The 569 IDC is a Single-Board Computer based on the 8085 CPU. It is utilized as a stand-alone digital controller in the system. The 569 IDC contains 2K bytes of RAM and sockets for up to 8K bytes of EPROM. In this application, less than 2K bytes of EPROM are required to store the main program. About 18 bytes of RAM are required to store values of variables and the register contents when they are pushed on the stack.

The 569 IDC contains three programmable counters on an 8253 chip. Of these three counters, a first counter (No. 0 on the 8253 chip) is used as counter T2 and connected directly to an edge triggered interrupt input of the CPU. This allows it to be used as the interrupt timer. When the counter reaches zero count, an interrupt is generated and applied to the CPU. The CPU then starts executing instructions at the interrupt vector memory location 003C (hexadecimal). Actually, a jump instruction to the actual interrupt service routine is placed here by the user. During the execution of the service routine, the next thyristor in sequence is fired and counter No. 0 is reloaded with the number of counts before the thyristor firing, and the process repeats itself. This mode of operation is achieved by programming counter No. 0 to operate in the software triggered strobe mode (Mode No. 4 on the 8253 chip).

A second counter, (counter No. 1 on the 3253 chip) is used as the master ramp timer $T_1$. It is programmed in the hardware triggered strobe mode (Mode No. 5), so the SYNC pulse triggers it to down count every cycle. The counter is rising-edge triggered and the SYNC pulse is applied directly to its gate input. The timer clock frequency is 1.3824 MHz so that 20,040 counts correspond to 1 cycle.

The 569 board IDC contains sockets for three programmable Input/Output ports that function as intelligent slaves to the host CPU. This allows the I/O processing to be custom-tailored to the required application. Either the Intel UPI-41A, or a 941 Industrial Digital Processor (IDP), on FIG. 8, may be used in these sockets. The 941 IDP at the interface seves as Exit port. Because the 941 IDP can execute nine dedicated I/O algorithms and eight common data manipulations, it is preferred for the simple I/O operations required in the power controller. Six of the 16 available I/O lines are used to latch the present thyristor firing sequence when it is output by the CPU. Eight of the lines are used to latch the binary representation of the present delay angle. The routine required to latch these outputs on the 941 IDP are discussed hereinafter.

The 569 communicates with other boards in the cardcage CC through the Intel MULTIBUS data bus DB. MULTIBUS DB is a standard data bus structure in which each output pin has a standard signal function.

The 732 ADB board is used to digitize the analog representation of the delay angle received on line 51 after transfer into the 614 card cage CC by a 910 analog terminating panel ATP, which is responsive to the reference signal $v_c$ on line 5, as well as to the SYNC pulse of line 2. The A/D converter is a 12-bit, 34 μs successive approximation device with a sample-and-hold amplifier which can be jumper-selected for a 0 to +5 V, 0 to +10 V, ±5 V, or ±10 V input range. In this instance, the board is wired for the 0 to +10 V range. The board has up to 16 differential, or 32 single-ended inputs. Only one single-ended input is used here for the delay angle. The ADB board includes a DC/DC converter module which supplies +15 V and −15 V power at 150 mA to the analog circuits. The +15 V supply is used to supply voltage to a potentiometer $P_1$ which serves to adjust the delay angle outputted on line 5. To this effect, the +15 V voltage is dropped through a 5K resistor ahead of a 10K delay angle potentiometer $P_1$ providing the required 0 to 10 V range.

The 732 ADB board communicates with the 569 IDC board through the MULTIBUS DB. The 732 ADB board interfaces as external memory, and any of the memory reference instructions from the 8085 CPU can be used to read from the 732 ADB board.

Signal conditioning is provided at the analog inputs by a 910 analog termination panel ATP. Similarly, a 920 digital termination panel DTP responds to outputted digital requests from the 614 card cage CC in providing the firing word on lines 10 to the thyristor firing circuitry (FC) and, via 12, to a 3-digit display by a light emitting diode display LED for the delay angle α.

The Signal Conditioning/Termination Panels ATP and DTP are heavy duty printed circuit board with screw terminators to which users can easily connect heavier gauge field signal wiring. These signals are then connected to flat ribbon cables on the board which then connect to the single board computer boards.

Figure 9:
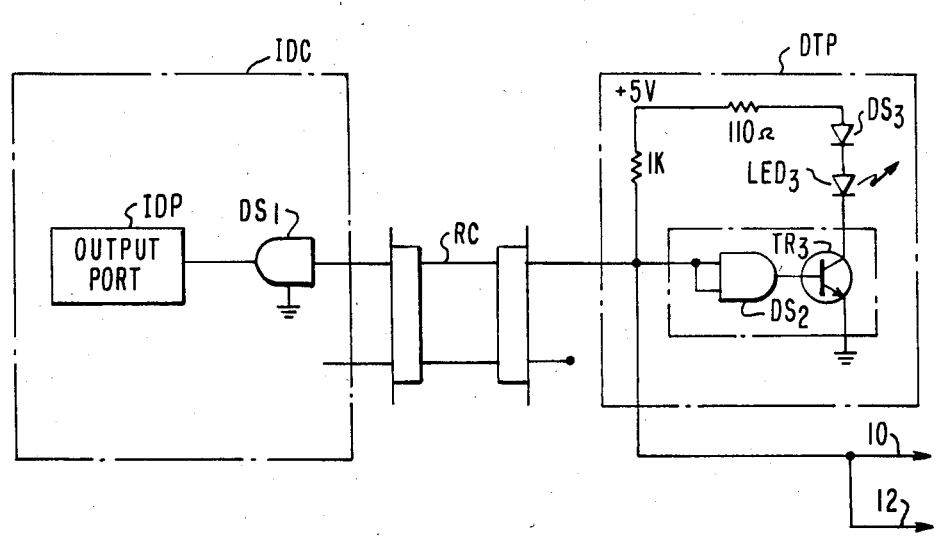
FIG. 9 illustrates the organization of one printed board circuit like those multiplexed in the block diagram of FIG. 8.

The mounting technique is illustrated for the 920 board DTP by FIG. 9. The IDC board carries the Exit port in the form of a 941 industrial digital processor IDP. The output goes to a driver device $DS_1$ and the so outputted signal is transmitted over a ribbon cable RC to the driver device $DS_2$ on the digital termination panel DTP. Device $DS_2$ is connected to the base of a transistor $TR_3$ which drives a diode $DS_3$ and an LED device $LED_3$. The output is between screw terminators from which lines 10 and 12 are derived.

The 920 board DTP provides sockets for line drivers, or opto-isolators, that can turn on the LED diodes on the board when the output signal is high. FIG. 9 shows how the line drivers IDP are configured on the 920 board DTP, to switch via lines 10 and 12 the LED OFF and ON.

Figure 10:
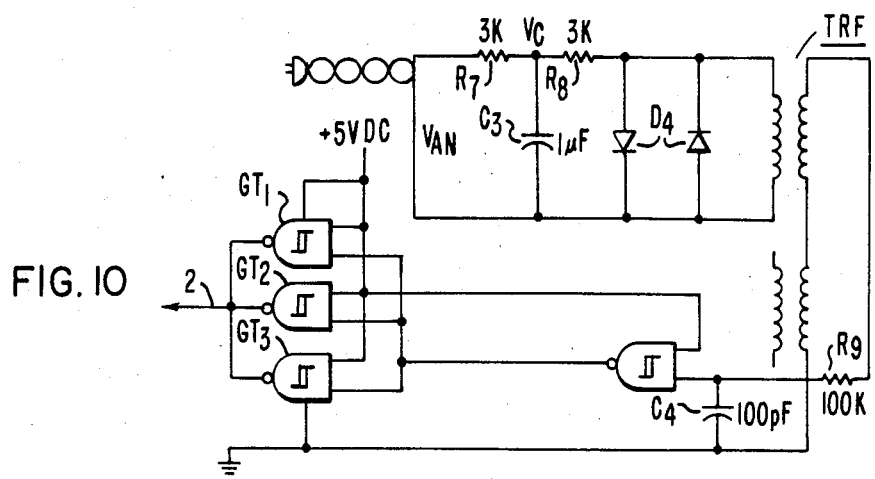
FIG. 10 is illustrative of the SYNC pulse circuitry that can be used with the block diagram of FIG. 8.
Figure 11:
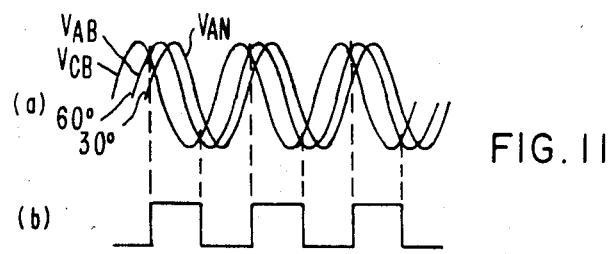
FIG. 11 shows with curves the timing relationship between the SYNC pulse and the line voltages.

A SYNC pulse is required to keep the Master Ramp timer $T_1$ synchronized with the line voltage. A rising edge of a pulse to the gate input of the Master Ramp $T_1$ counter resets it to start down-counting from a preset value. The SYNC circuitry illustrated in FIG. 10 performs this function. The input line to neutral voltage $V_{AN}$ is first low-pass filtered by a T network composed of resistors $R_7$, $R_8$ and capacitor $C_3$. This filtering is required to remove any noise spikes from the line voltage that would result in spurious SYNC pulses. The transfer function of this network is such that the voltage $v_c$ across capacitor $C_3$ lags the input, $V_{AN}$, by 30°. The SYNC pulse will then lag the A-phase by 30°. As FIG. 11 shows, this point corresponds to the natural commutation point of the line-to-line voltages, $V_{AB}$ and $V_{CB}$.

Therefore, the first thyristor firing in each cycle should correspond to the $V_{AB}$ phase.

At the output of the filter network diodes $D_4$ clip the sinusoidal line voltage to approximate a square wave. The latter is then applied to a transformer TRF which steps up the voltage so that the slope of the square wave will be very steep at the zero-crossings. This steep transition will help minimize the effects of any spurious noise in the vicinity of the zero-crossing, where the sync pulse should occur. A 100K resistor $R_9$ and a 100 pF capacitor $C_4$ also provide some low-pass filtering before the final output on line 2.

A CMOS Schmitt trigger circuit, including these NAND gates $GT_1$, $GT_2$, $GT_3$, provides hysteresis in the output to prevent OFF-ON flickering of the SYNC pulse. The three gates $GT_1$–$GT_3$ are tied together at the output to provide enough current drive for a TTL load.

During the period between $T_2$ timer interrupts, the microprocessor outputs the latest value of the delay angle. This value is latched onto the 941 IDP output port, and routed out to the 920 digital output board DTP. This 8-bit representation of the delay angle is then converted to BCD code and displayed by 7-segment LED's.

In the thyristor firing circuit of FIG. 7, when the gate $G_2$ of line 10 goes low, $TR_1$ turns ON and current is provided for the LED in the opto-isolator GE. This turns ON the transistor in the opto-isolator which turns ON $TR_2$. The collector current from $TR_2$ provides a positive voltage across a 100Ω resistor. This pulse which is about 1 V, triggers the gate of the corresponding thyristor $TH_2$.

The following chart shows the firing words delivered by the 569 IDC board in the order that they occur during one complete cyle. It is observed that, through its software, the microprocessor actually outputs the complement of the firing words shown, but these words are inverted by a 7437 chip at the output of the 569 board IDC.

| Cycle Order | Firing Word Output by 569 Board | Line-to-Line Phase Switched | Thyristors ON |
|---|---|---|---|
| 1 | 0 1 1 1 1 0 | $V_{AB}$ | $TH_1$, $TH_6$ |
| 2 | 0 0 1 1 1 1 | $V_{AC}$ | $TH_1$, $TH_2$ |
| 3 | 1 0 0 1 1 1 | $V_{CB}$ | $TH_3$, $TH_2$ |
| 4 | 1 1 0 0 1 1 | $V_{BA}$ | $TH_3$, $TH_4$ |
| 5 | 1 1 1 0 0 1 | $V_{CA}$ | $TH_5$, $TH_4$ |
| 6 | 1 1 1 1 0 0 | $V_{CB}$ | $TH_5$, $TH_6$ |

Figure 12:
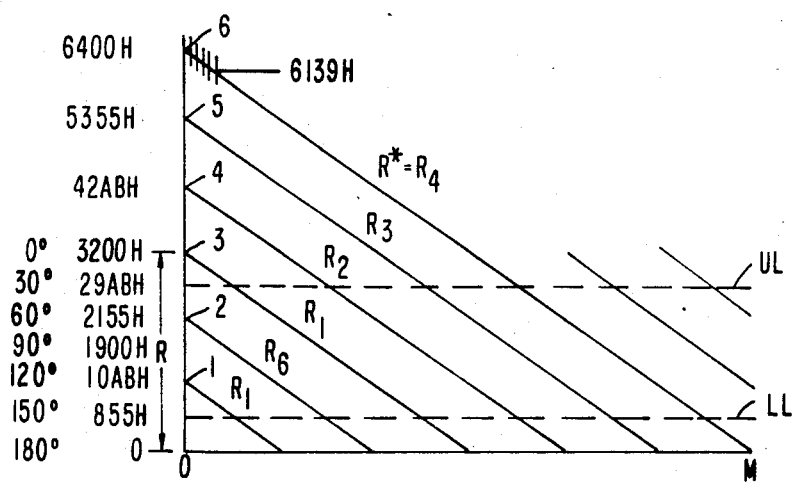
FIG. 12 is illustrative of a numerical relationship between the auxiliary ramps for delay angles ranging from 0° to 180°.

Referring to FIG. 12, the six ramps $R_1$–$R_6$ of FIG. 5, are shown in hexadecimal representation for a 8253 timer $T_1$ at 2 MHz of counts for 60 Hz (ora along the abscissa). The ordinates read 6400 H for $R^*$ on ramp $R_4$; 5355 H for ramp $R_3$; 42AB H for ramp $R_2$; 3200 H for ramp $R_1$; 2155 H for ramp $R_6$ and 10AB H for ramp $R_5$. The useful range for the delay angle is limited to between an upper limit UL for 300 (at 29AB H) and a lower limit LL for 150° (at 855 H). The value of R is 3200 H which corresponds to $\frac{1}{2}R^*$ max. and represents a range of 180° from 0 reached at the maximum of $R_1$.

The sequence of events in the digital hardware, typically, is as follows:
1. Timer $T_2$ has been loaded with the number of counts before the next thyristor sequence should be fired. Upon reaching terminal count, timer $T_2$ interrupts the CPU.
2. The CPU recognizes the interrupt and outputs the next thyristor firing word on line 10. As an example, this may be 100001, indicating thyristors $TH_1$ and $TH_2$ in FIG. 1 should be ON.
3. The CPU reads the present value $R^*$ of the Mater Ramp from timer $T_1$.
4. With this value $R^*$, the CPU calculates the value of one of the ramps $R_1$–$R_6$ corresponding to the next thyristor to be fired.
5. Given the value $R^*$, and the value $R_\alpha$ for the delay angle $\alpha$, the CPU calculates the number of interrupt counts d that should pass before the thyristor "next" in the sequence can be fired.
6. The CPU loads timer $T_2$ with the value d, and timer $T_2$ starts counting down.
7. The CPU can perform other functions, or wait, until the next interrupt occurs, and the process repeats itself.

Figure 13:
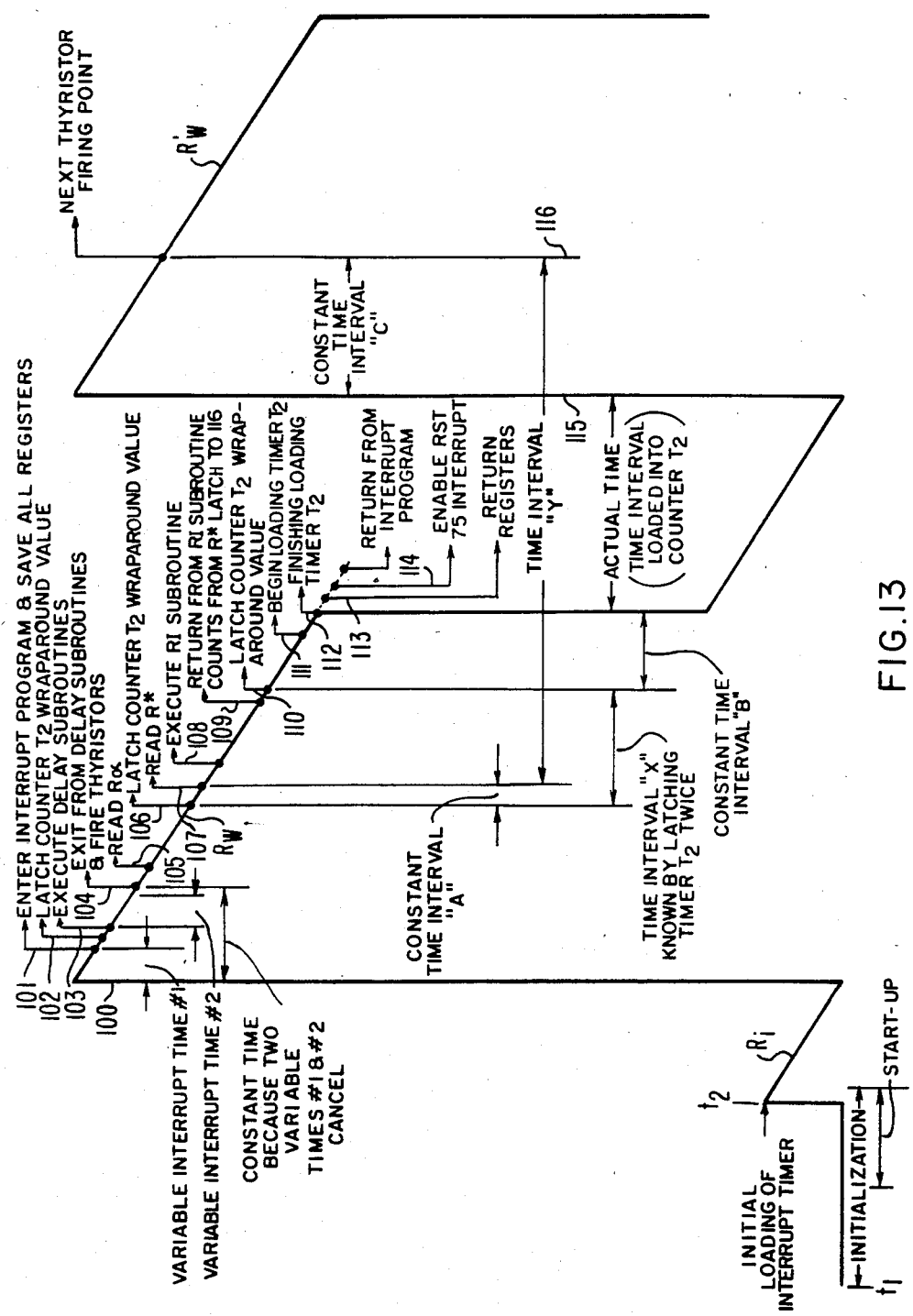
FIG. 13 is a chart indicating the tasks and their timing as they occur during one cycle delineated by two successive thyristor firing instants.

Referring to FIG. 13, a chart is provided to indicate the tasks of the CPU and their timing as they occur during one cycle delineated by two successive thyristor firing instants, namely at 104 and at 116 on the chart. FIG. 13 will be explained with peculiarity in the Appendix attached hereinafter to provide in detail, with a listing, routines and subroutines as can be used according to one embodiment of the invention which is illustrative of a possible implementation thereof.

Summarizing the main steps indicated by reference numerals on FIG. 13, the following remarks are in order:

The figure represents the count of time $T_2$ as a function of time. Following initialization, at time $t_1$ initial loading of timer $T_2$ takes place at time $t_2$. After counting down to zero, the down counter of timer $T_2$ jumps back to its full value (FFFFH from 0000) at step 100. A variable interrupt time lapses until 101 which is followed by latching the wraparound value at 102. At 103 the CPU executes the delay subroutines, then exits at 104, at which time the thyristors are being fired, thus in accordance with the preceding firing cycle. The new firing cycle starts at 105 by reading $R_{60}$. At 106 timer $T_2$ has its counter latched with the wraparound value. Then, at 107, after a constant time interval A, the value $R^*$ is read on the ramp. The time interval until firing extends from 107 until 116. In the meantime the CPU effectuates the following tasks:

At 108 the RI subroutine is executed and at 109 the CPU returns with the number of counts, corresponding to d on FIG. 6, which results from a comparison between $R_\alpha$ and $R^*$. Actually, this number of counts represents the time interval between when $R^*$ was last latched (at 106) and the anticipated "reset" firing point (at 116). At 110 the wraparound value is latched from the counter of timer $T_2$. At 111 the counter is loaded, an operation which actually lasts until 112. From 112 until 115 lapses a time interval which is the time conversion of the loaded count. From 115 to 116 a constant time interval C, identical to the one from 100 to 104, elapses. From instant 110 to instant 112 the time interval B is constant. The "actual time" that should be loaded into the $T_2$ counter extends from 112 to 115 and is equal to $Y+A-X-C-B$, as can be seen from the chart of FIG. 13.

The Appendix A will now provide a detailed functional explanation of the software implementation of the heretofore described invention and it is followed by Appendix B providing a program listing for this software implementation.

(The following page is Appendix page A1.)

APPENDIX A

It is recalled that when translating a count R* read from the master timer $T_1$ ramp, the following set of equations is used taking into account the facing remarks:

| | | REMARKS |
|---|---|---|
| (1) | $R_1 = R^* - R$ | When this calculation is performed, the value of R* in timer $T_1$ should be in the range of $0 \leq R^* \leq (1/6)R^*$ max or $(\frac{5}{6})R^*$ max $\leq R^* \leq R^*$ max |
| (2) | $R_2 = R^* - (\frac{2}{3})R$ | When this calculation is performed, the value of R* in timer $T_1$ should be in the range of: $(\frac{1}{2})R^*$ max $\leq R^* \leq R^*$ max |
| (3) | $R_3 = R^* - (\frac{1}{3})R$ | When this calculation is performed, the value of R* in timer $T_1$ should be in the range of: $(\frac{1}{3})R^*$ max $\leq R^* \leq R^*$ max |
| (4) | $R_4 = R^*$ | When this calculation is performed, the value of R* in timer $T_1$ should be in the range of: $(1/6) R^*$ max $\leq R^* \leq (\frac{5}{6})R^*$ max |
| (5) | $R_5 = R^* + (\frac{1}{3})R$ for $0 \leq R^* \leq (\frac{1}{2})R^*$ max | When these calculations are performed, the value of R* in timer $T_1$ should be in the range of: $0 \leq R^* \leq (\frac{2}{3})R^*$ max |
| (6) | $R_5 = R^* - (5/3)R$ for $(5/6)R^*$ max $\leq R^*$ | |
| (7) | $R_6 = R^* + (\frac{2}{3})R$ for $0 \leq R^* \leq (1/6)R^*$ max | When these calculations are performed, the value of R* in timer $T_1 =$ should be in the range of: $0 \leq R^* \leq (\frac{1}{3})R^*$ max or $(5/6)R^*$ max $\leq R^* \leq R^*$ max |
| (8) | $R_6 = R^* - (4/3)R$ | where R* lies in the range: $(\frac{2}{3})R^*$ max $\leq R^* \leq R^*$ max |

In the implementation, a first requirement limits the range of magnitude of the delay angle to between 30° and 150° for practical reasons. Another requirement limits the change of the delay angle between two consecutive thyristor firings to a maximum of 20° so that the possibility of a negative time interval never exists. The manner in which these restrictions apply to the microprocessor design is a follows:

1. After $R\alpha$ has been scaled, the values read by the processor CPU should correspond to angles only in the range of 30° to 150°; and
2. The difference between any two consecutive values of $R\alpha$ should not represent an angle greater than 20°.

There are other microprocessor considerations which may be mentioned. First, a certain interrupt latency time exists within most microprocessors. This means that real time occurrences and microprocessor time occurrences are not synchronized. Two other considerations are peculiar to the 8253 programmable timer used for $T_1$. First, this timer has the capability of being read without interrupting its timing sequence. Moreover, this timer continually counts and overlaps itself in any mode of operation.

One suitable example of an illustrative software implementation of the present invention is shown in FIG. 13. There, a functional diagram illustrates as a function of time the successive steps performed with the assist of the CPU that controls the three-phase power converter. The first CPU action is, at time $t_1$, to initialize any ports, memory locations, and timers required to control the converter. At time $t_2$ toward the end of the initialization process, the timer $T_1$ corresponding to ramp R* is loaded so that it reaches terminal count in 1/60 of a second. Timer $T_1$ is reinitialized with every SYNC pulse and its function is to provide the microprocessor with a timing reference between SYNC pulses. This timing reference is utilized by the processor to determine the firing times of the thyristors.

Once the R* timer is loaded at $t_2$ with the proper value, a start-up routine is entered. This routine simply polls the R* timer for a particular range of values corresponding to angles less than or equal to 10° on secondary ramp, for instance $R_1$. When a value in this range is found, the routine calculates the count value that should be loaded into the interrupt timer so that upon interrupt recognition the thyristors for ramp $R_1$ are fired at a delay angle of 90°. Firing the thyristors of ramp $R_1$ with an initial 90° delay angle produces zero output voltage.

The first ramp $R_i$ illustrated in FIG. 13 is the one associated with the initial interrupt timer $T_2$ counting sequence. During this time interval, the processor simply waits until it is interrupted by the terminal count of the interrupt timer. Immediately after the interrupt timer reaches terminal count it wraps around to FFFF H and continues to down count. The second ramp $R_W$ represents this wraparound counting sequence. As shown in the trapezoid portion of ramp $R_W$ (between 100 and 101), there is a certain variable interrupt recognition time associated with the 8085 microprocessor. The range of this variable interrupt recognition time is one to nineteen states of the processor.

At 101 upon interrupt recognition, all the registers are saved on the stack so that control can be transferred back to a user program at a later time. At 102, the interrupt counter $T_2$ wraparound value is latched to determine the number of states associated with the interrupt latency time. This value is also used to transfer control to one of ten delay subroutines which correct the interrupt latency time by making it a constant 23 states. The idea here is that there are only ten possible values which can be read from the interrupt timer when it is latched since the frequency of the 8253 is ½ the frequency of the processor and the variable interrupt time is one to nineteen states of the processor. Once control is returned from the delay subroutines at 104, the thyristors corresponding to a particular ramp are fired.

The interrupt routine continues with the processor preparing to calculate the next value that should be loaded into the interrupt timer. First, at 105 the processor reads in a new value of $R\alpha$. This is accomplished by executing the $R\alpha$ subroutine which, in addition to obtaining the present value of $R\alpha$, also performs the following two checks:

1. The angle $R\alpha$ represents must be within the practical angular limits of the converter.
2. The variance of the angle that $R\alpha$ represents must be less than 20° between two consecutive readings.

If either of these checks is positive, the microprocessor alerts the converter operator and implements the two following solutions:

1. If the value of $R\alpha$ corresponds to an angle out of the angular limits of the converter, $R\alpha$ is forced to be the closest end stop value.
2. If the variance of $R\alpha$ exceeds 20°, the variance is forced to exactly 20°.

After obtaining a new $R\alpha$ value the interrupt routine at 106 latches and saves the present interrupt counter wraparound value for a future calculation. Then, at 107 a new value of the master ramp R* is read by executing the subroutine R*. This subroutine checks to insure that the read in value of R* does not exceed the maximum allowable value. If the value of R* does exceed the maximum value, R* is forced to zero. This error occurs due to counter wraparound and lack of synchronization between the SYNC pulse and the terminal count of the R* timer $T_1$.

Once recent allowable values have been obtained for $R\alpha$ and R* the interrupt routine at 108 transfers control to one of six RI subroutines (for the respective ramps $R_1-R_6$). These subroutines have two purposes. First, they make sure that R* is in the proper range for the future calculation of the parameter "Y". This eliminates the possibility of a drastic error such as a missed syn pulse or time malfunction. For instance, if a SYNC pulse were not detected the value of R* would remain equal to zero for several consecutive readings, thereby, enabling these routines to detect such an error. The second function of these six subroutines is to calculate the value of the parameter Y which is the time between 107 and 116 when the next thyristor is to be fired. This is done, in this instance, with the use of the equations from Equation Set #1 and the most recent values of $R\alpha$ and R*.

When control is transferred back at 109 to the interrupt routine, another interrupt counter wraparound value is latched, at 110 so that the variable "X" (between 106 and 110) may be calculated. The parameter "X" is a variable due to the fact that there are six different RI subroutines and each particular RI subroutine has different limit checks to perform within itself. Upon determining the variable X and Y, the processor calculates the actual time to load the interrupt timer $T_2$ with, by solving the following equation:

Actual time = $(Y+A)-X-C-B$, (where A is a constant time interval between 100 and 104 as well as between 106 and 107; B is a constant time interval between 110 ans 112; C is a constant time interval between 115 and 116). The various parameters are illustrated in FIG. 13. Once this calculation is completed, the interrupt timer $T_2$ is loaded with the actual time and the necessary steps to return program control to a user program are executed.

The third sloping ramp $R'_W$ is the counting down slope associated with the interrupt timer $T_2$ for the "next" thyristor to be fired and the process repeats itself from thyristor to thyristor.

The following is a program outline summarizing the detailed steps of a software program given hereinafter.

I. INITIALIZATION

A. Program a counter of the 8253 CPU to operate in mode four. This mode of operation is initiated at $t_2$ by simply loading counter $T_2$ with a given count down value. The output of this counter should be connected to an edge sensitive interrupt of the processor. This counter is the interrupt timer $T_2$.

B. Program a counter of the 8253 CPU to operate in "mode five". This mode of operation is initiated by a rising edge pulse applied to the gate input. This counter should be loaded such that it down counts to zero f times per second where f is the frequency of the sync pulse (60 Hz in the example). This counter is the master ramp (R*) timer $T_1$.

C. Initialize the Stack pointer.

D. Initialize the ports necessary for program control:

1. 12 inputs for the A to D converter which varies the value of $R\alpha$.
2. 2 ports, one an input and one an output, to control the A to D.
3. 6 outputs for gating the thyristors.
4. If desired, additional inputs and outputs for Alert programs.

E. Initialize the following memory locations:

1. CHECK—This memory location maintains the value of the previous thyristor firing angle so that the maximum allowed variance of 20° may be checked. In this program, CHECK is initialized with a value corresponding to 90° so that the first thyristor firing will not participate in any power conversion.
2. SEQ—This memory location maintains the gating sequence of the thyristors and is initialized so that the thyristors corresponding to ramp $R_1$ are fired.
3. RI—This memory location is used to store the beginning location of one of six calculation subroutines.

F. Load the counter which is programmed for mode five with the maximum value of R*.

G. Enable interrupt RST 7.5 so that the interrupt timer is utilized properly.

II. START-UP

A. Continually read in the value of the R* timer until a value is read which corresponds to an angle $\geq 0°$ but $\leq 10°$ on the $R_1$ ramp FIG. 4 illustrates this region on the master ramp by the checked section which ends with the hex number 6139.

B. Calculate the time necessary to load the interrupt timer so that the thyristors corresponding to ramp $R_1$ are fired at an angle of 90°.

C. Load the interrupt timer.

D. Continue with other user programs.

III. INTERRUPT ROUTINE

Entry Point: The interrupt sequence is initiated when the interrupt timer times out. Actually, the interrupt sequence begins one count of the 8253 after the terminal count of the interrupt timer is reached. This is due to the fact that the RST 7.5 is rising edge triggered.

A. Save all user registers so the program that was interrupted may be continued.

B. Read in the contents of the interrupter timer.
   1. The interrupt timer will overlap and immediately begin counting down from FFFF after the interrupt terminal count is reached. Therefore, by reading this counter upon interrupt recognition, it is possible to calculate the exact interrupt latency time.

C. Transfer control to the delay subroutine which will make the variable interrupt latency time a contstant.
   1. The transfer of control to the delay subroutines is accomplished by knowing there are only certain possible values that will be read from the interrupt timer.

D. Upon return from the delay subroutines, fire the proper thyristor sequence.

E. FIG. 13 illustrates the entire interrupt routine timing by following the interrupt timer $T_2$ as it overlaps and continues to count down. The specific time occurrences 100-116 in the interrupt routine are exemplified in this functional diagram.

IV. RSTAR SUBROUTINE

A. Latches onto the contents of the R* timer.
B. Checks to make sure the value read in is less than the maximum R* value. This eliminates the possible error of counter wraparound by forcing any value greater than the maximum R* to zero.
  1. The maximum value of R* is determined by the clock frequency of the 8253 CPU timer.
Exit Points: This subroutine returns the value of R* in two locations:
  1. HL register.
  2. R*STAR memory location.

V. R-ALPHA SUBROUTINE

A. Reads in the 12-bit value from the A to D converter which represents the upper four bits of the high order byte are masked off.
  1. The value read in from the A to D should be scaled so that its maximum value is an integer multiple of ½ R* max. This integer multiple should be as small as possible, thereby maintaining the degree per bit accuracy as high as possible.
B. Multiply the value read in for $R\alpha$ by the necessary integer to make its full range of values be 0 to ½ R* max.
C. Make sure this multiplied value of $R\alpha$ does not represent an angle outside the range of 30° to 150°. If it is out of this range, force $R\alpha$ to be one of the end stops.
D. Make sure the new value read in for $R\alpha$ does not represent an angle which differs from the angle the old value of $R\alpha$ represented by more than 20°. If it does differ by more than 20°, force the angle to differ by exactly 20°.
Exit Points: This subroutine returns the value of $R\alpha$ in three locations:
  1. HL register.
  2. DE register.
  3. CHECK memory location.

VI. RI Subroutines

Exit Points: Two memory locations must be occupied before entering this subroutine:
  1. R* memory location must contain the most recent value of the master ramp.
  2. The DE register must contain the most recent value of $R\alpha$.
A. Check to make sure R* is in the proper range so that the future calculation of Y in FIG. 13 is possible.
  Example: Assuming the thyristor in the sequence corresponding to the ramp $R_6$ was just fired, the thyristor firing point is located on the ramp of FIG. 13. Once the thyristor corresponding to ramp $R_6$ has been fired, new values for $R\alpha$ and R* are read. The RI subroutines are then entered. In this particular case, the $R_1$ subroutine would be initiated. The first thing accomplished by this subroutine is to check whether the last value read for R* is in the range of possible values corresponding to ramp $R_6$. This check eliminates the possible error of a missed SYNC pulse.
B. Calculate the next R* firing value by using the equations in Equation Set 1.
C. Calculate the variable Y of FIG. 13 by subtracting the next R* firing angle from the one last read.
D. Push the value of the variable Y on the stack.
E. Load memory location RI with the beginning location of the next successive RI subroutine.
F. Load memory location SEQ with the next thyristor firing in the sequence.
Exit Point: This subroutine returns the value Y in one location, the stack.

VII. DELAY SUBROUTINES

The purpose of these subroutines is to time the firing of the thyristors as close as possible. The need of these routines arises from the indefinite time period associated with interrupt recognition. If the timing of the CPU 8085 microprocessor is studied closely, it can be shown that there are only a few possible values that can be read off the interrupt timer $T_2$ immediately after interrupt recognition.

Timing Facts Pertinent to the hardware used.
A. One clock count of the 8253 CPU timer $T_1$ passes after terminal count before rising edge is applied to the "RST 7.5" input of the CPU 8085. This is taken into account when loading the interrupt timer.
B. Response time on the CPU 8085 microprocessor may vary between 1 and 19 states.
C. 12 states of the microprocessor are required for pushing the program counter on the stack.
D. 10 states of the microprocessor are required for jumping from the ROM interrupt vector to the RAM interrupt vector.
E. 10 states of the microprocessor are required for jumping from the RAM interrupt vector to the interrupt program.
F. 65 states of the microprocessor are required for latching onto the contents of the interrupt counter and saving the user registers.
Total Time:
  98 to 117 states on the CPU 8085;
  49 to 58 counts on the 8253 timer $T_1$;
Therefore, the possible values that can be read from the interrupt timer $T_2$ upon interrupt recognition are:

49 to 58  $\Longleftrightarrow$  31 H to 3A H

```
 FFFF         FFFF
-  31        -  31
 FFC5         FFC5
```

FFC5  $\Longleftrightarrow$  FFCE

G. The least significant hex digit is used to determine which delay routine is executed. The following table illustrates the delays associated with each digit.

| Hex No. | -Delay States |
|---|---|
| 5 | 19 |
| 6 | 17 |
| 7 | 15 |
| 8 | 13 |
| 9 | 11 |
| A | 9 |
| B | 7 |

| Hex No. | Delay States |
|---------|--------------|
| C | 5 |
| D | 3 |
| E | 1 |

H. The Delay Subroutine function to make the number of delay states equal to 23 in all cases.

APPENDIX B

The following pages are a typical control program based on an ISIS-II 8080/8085 Macro Assembler as used for the 569 IDC Board of FIG. 8. The instruction program listing is written in the assembly language of the Intel 8085 microprocessor. This instruction program listing is included to provide an illustration of one suitable embodiment of the present invention that has been developed.

ASM80 IDC.SRC

```
ISIS-II 8080/8085 MACRO ASSEMBLER, V3.0          IDC      PAGE   1
CONTROL PROGRAM

LOC  OBJ         LINE        SOURCE STATEMENT

1  $TITLE('CONTROL PROGRAM') DEBUG
                     2  $MOD85
                     3          NAME    IDC
                     4  ;
                     5  ;
                     6  ; CREATED: SEPTEMBER 1980
                     7  ;
                     8  ;              ***************************
                     9  ;
                    10  ;              INITIALIZATION PROGRAM
                    11  ;
                    12  ;              ***************************
                    13  ;
                    14  ;
                    15  ;
  87FF              16  STKTOP   EQU     87FFH           ; INITIAL TOP OF STACK
                    17  ;                                  AT TOP OF 569 RAM
  0021              18  FIRE#1   EQU     21H             ;(00)100001 GATE DRIVE WORD 1 (GDW 1)
  0030              19  FIRE#2   EQU     30H             ;(00)110000 GDW 2
  0018              20  FIRE#3   EQU     18H             ;(00)011000 GDW 3
  000C              21  FIRE#4   EQU     0CH             ;(00)001100 GDW 4
  0006              22  FIRE#5   EQU     06H             ;(00)000110 GDW 5
  0003              23  FIRE#6   EQU     03H             ;(00)000011 GDW 6
                    24  ;
  0004              25  PAGE?D   EQU     HIGH D4         ; PAGE OF D4
                    26  ;
  5A00              27  TIM360   EQU     5A00H           ; R* TIME FOR 360 DEGREES
  0280              28  TIM010   EQU     TIM360 / 36     ; +10 DEGREE INTERVAL
  0500              29  TIM020   EQU     TIM360 / 18     ; +20 DEGREE INTERVAL
  0780              30  TIM030   EQU     TIM360 / 12
  0F00              31  TIM060   EQU     TIM360 / 6
  1680              32  TIM090   EQU     TIM360 / 4
  1E00              33  TIM120   EQU     TIM360 / 3
  2580              34  TIM150   EQU     (TIM360 / 2) - TIM030
  2D00              35  TIM180   EQU     TIM360 / 2
  3C00              36  TIM240   EQU     TIM360 - TIM120
  4B00              37  TIM300   EQU     TIM360 - TIM060
                    38  ;
                    39  ;
                    40  ;       I/O PORT ASSIGNMENTS
                    41  ;
  00E3              42  T#CSR    EQU     0E3H            ; TIMER CONTROL/STATUS
  00E0              43  T#DB0    EQU     0E0H            ; TIMER_0 (INTERRUPT TIMING)
  00E1              44  T#DB1    EQU     0E1H            ; TIMER_1 (R* RAMP)
  00E2              45  T#DB2    EQU     0E2H            ; TIMER_2 DATA
                    46  ;
  F700              47  BASE     EQU     0F700H          ;BASE ADDRESS OF 732 INTERFACE
  F701              48  FCR      EQU     BASE+1          ;MUX ADDRESS REGISTER
  0006              49  GACHAN   EQU     06H             ;CHANNEL 6 OF 732 INPUT
  F704              50  ADDATA   EQU     BASE+4          ;A/D DATA REGISTER
  0681              51  REFER    EQU     0681H           ;OFFSET VALUE
                    52  ;
  0009              53  WRP1     EQU     09H             ;WRITE TO PORT 1 ON 941
  000A              54  WRP2     EQU     0AH             ;WRITE TO PORT 2 ON 941
  LOC  OBJ         LINE        SOURCE STATEMENT

00E5              55  IDPC     EQU     0E5H            ;941 COMMAND REGISTER ADDRESS
  00E4              56  IDPD     EQU     0E4H            ;941 DATA REGISTER ADDRESS
  00E5              57  IDPS     EQU     0E5H            ;941 STATUS REGISTER ADDRESS
  0002              58  IBF      EQU     02H             ;941 INPUT BUFFER FULL
                    59  ;
                    60
  0000              61           ORG     0000H           ;START OF EPROM
  0000 F3           62  BEGIN:   DI
  0001 C30001       63           JMP     MAIN
                    64  ;
  0024              65           ORG     0024H           ;INITIALIZE ALL INTERUPT VECTORS
  0024 C3ED04       66  TRAP:    JMP     INTER
                    67  ;
  003C              68           ORG     003CH           ;INTERUPT TIMER INTERUPT
  003C C36D01       69  RST75:   JMP     SERVE           ;SERVE FIRES THYRISTORS AND LOADS NEXT INTERUPT COUN
                    70  ;
  0034              71           ORG     0034H
```

| LOC | OBJ | LINE | | | SOURCE STATEMENT | |
|---|---|---|---|---|---|---|
| 0034 | C3ED04 | 72 | RST65: | JMP | INTER | |
| | | 73 | ; | | | |
| 002C | | 74 | | ORG | 002CH | |
| 002C | C3ED04 | 75 | RST55: | JMP | INTER | |
| | | 76 | ; | | | |
| 0040 | | 77 | | ORG | 0040H | |
| 0040 | C3ED04 | 78 | INTM1: | JMP | INTER | |
| | | 79 | ; | | | |
| 0048 | | 80 | | ORG | 0048H | |
| 0048 | C3ED04 | 81 | UPI0: | JMP | INTER | |
| | | 82 | ; | | | |
| 0050 | | 83 | | ORG | 0050H | |
| 0050 | C3ED04 | 84 | T530: | JMP | INTER | |
| | | 85 | ; | | | |
| 0058 | | 86 | | ORG | 0058H | |
| 0058 | C3ED04 | 87 | UPI1: | JMP | INTER | |
| | | 88 | ; | | | |
| 0060 | | 89 | | ORG | 0060H | |
| 0060 | C3ED04 | 90 | T531: | JMP | INTER | |
| | | 91 | ; | | | |
| 0068 | | 92 | | ORG | 0068H | |
| 0068 | C3ED04 | 93 | UPI2: | JMP | INTER | |
| | | 94 | ; | | | |
| 0070 | | 95 | | ORG | 0070H | |
| 0070 | C3ED04 | 96 | T532: | JMP | INTER | |
| | | 97 | ; | | | |
| 0078 | | 98 | | ORG | 0078H | |
| 0078 | C3ED04 | 99 | INTM7: | JMP | INTER | |
| | | 100 | ; | | | |
| 0100 | | 101 | | ORG | 0100H | |
| 0100 | 3EB8 | 102 | MAIN: | MVI | A,0B8H | |
| 0102 | D3E3 | 103 | | OUT | T@CSR | ; INIT TIMER_2 TO COUNT IN MODE 4 |
| 0104 | 3E38 | 104 | | MVI | A,38H | ;INITIALIZE TIMER_0 FOR MODE 4, |
| 0106 | D3E3 | 105 | | OUT | T@CSR | ;...TO USE AS INTERRUPT TIMER. |
| 0108 | 3E7A | 106 | | MVI | A,7AH | ;INITIALIZE TIMER_1 FOR MODE 5, |
| 010A | D3E3 | 107 | | OUT | T@CSR | ;...TO USE AS "R*" TIMER. |
| 010C | 31FF87 | 108 | | LXI | SP,STKTOP | |
| 010F | 218016 | 109 | | LXI | H,TIM090 | ;INITIALIZE "CHECK" |
| 0112 | 220280 | 110 | | SHLD | CHECK | ; ...WHICH STORES A VALUE CORRESPONDING TO |
| | | 111 | | | | ; ...THE LAST FIRING ANGLE.  THE VALUE IS |
| | | 112 | | | | ; ...KEPT TO MAKE SURE THAT 2 CONSECUTIVE |
| | | 113 | | | | ; ...FIRING ANGLES DO NOT VARY BY MORE THAN |
| | | 114 | | | | ; ...20 DEGREES. |
| 0115 | 3E07 | 115 | | MVI | A,07H | ;INITIALIZE PROGRAMMABLE LATCH |
| 0117 | D3EA | 116 | | OUT | 0EAH | ;ENABLE 941 I/O PORT |
| 0119 | 3E00 | 117 | | MVI | A,00H | ;INITIALIZE FIRING WORD TO 00H |
| 011B | 320080 | 118 | | STA | SEQ | |
| 011E | 0E09 | 119 | | MVI | C,WRP1 | |
| 0120 | CDDF04 | 120 | | CALL | WRCMD | |
| 0123 | 3E21 | 121 | | MVI | A,FIRE@1 | ;LOAD THE INITIAL THYRISTOR FIRING SEQUENCE |
| 0125 | 320080 | 122 | | STA | SEQ | ; ...CORRESPONDING TO RAMP R1. |
| 0128 | 219F02 | 123 | | LXI | H,R2 | ; "RI" <= ADDRESS(SUBROUTINE "R2") |
| 012B | 220480 | 124 | | SHLD | RI | |
| 012E | 3E00 | 125 | | MVI | A, LOW TIM360 | ;LOAD TIMER_1 SUCH THAT IT DOWN-COUNTS |
| 0130 | D3E1 | 126 | | OUT | T@DB1 | ; ...60 TIMES PER SECOND. |
| 0132 | 3E5A | 127 | | MVI | A, HIGH TIM360 | |
| 0134 | D3E1 | 128 | | OUT | T@DB1 | |
| 0136 | 3E1B | 129 | | MVI | A,1BH | ;ENABLE ONLY THE RST 7.5 INTERRUPT |
| 0138 | 30 | 130 | | SIM | | |
| 0139 | FB | 131 | | EI | | ;ENABLE INTERUPTS |
| | | 132 | ; | | | |
| LOC | OBJ | LINE | | | SOURCE STATEMENT | |
| | | 133 | ; | | ******************** | |
| | | 134 | ; | | | |
| | | 135 | ; | | START-UP PROGRAM | |
| | | 136 | ; | | | |
| | | 137 | ; | | ******************** | |
| | | 138 | ; | | | |
| | | 139 | ; | | | |
| | | 140 | ; | | | |
| 013A | CDC401 | 141 | AGAIN: | CALL | RSTAR | ;READ THE VALUE OF THE R* TIMER AND |
| 013D | 1180A8 | 142 | | LXI | D,-(TIM360-TIM010) | ; ...BREAK OUT OF THIS LOOP ONLY IF IT |
| 0140 | 19 | 143 | | DAD | D | ; ...CORRESPONDS TO AN ANGLE .LE. 10 DEGREES |
| 0141 | D23A01 | 144 | | JNC | AGAIN | ; ...ON RAMP R1. |
| | | 145 | | | | |
| 0144 | 2A0680 | 146 | | LHLD | R?STAR | ;STORE THE MOST RECENT VALUE OF R* IN <H,L>. |
| | | 147 | | | | |
| | | 148 | | ;SUBTRACT THE FOLLOWING FROM THE MOST RECENT | | |
| | | 149 | | ;VALUE OF R*: | | |
| | | 150 | ; | | 1. THE COUNT VALUE WHICH CORRESPONDS TO 90 DEGREES | |
| | | 151 | ; | | ON THE R1 RAMP. | |
| | | 152 | ; | | 2. THE # OF COUNTS WHICH HAVE PASSED SINCE R* WAS READ. | |
| | | 153 | ; | | 3. THE # OF COUNTS IT WILL TAKE TO LOAD THE INTERRUPT | |
| | | 154 | ; | | TIMER. | |
| | | 155 | ; | | 4. THE # OF COUNTS UNTIL FIRING OF THE THYRISTORS | |
| | | 156 | ; | | IN THE INITIALIZATION PROGRAM. | |
| | | 157 | ; | | | |
| 0147 | 11D9BB | 158 | | LXI | D,0BBD9H | |
| 014A | 19 | 159 | | DAD | D | |
| 014B | 7D | 160 | | MOV | A,L | ;LOAD THE INTERRUPT TIMER. |
| 014C | D3E0 | 161 | | OUT | T@DB0 | |
| 014E | 7C | 162 | | MOV | A,H | |
| 014F | D3E0 | 163 | | OUT | T@DB0 | |
| | | 164 | ; | | | |

```
                                        *********************
                                          DISPLAY ROUTINE
                                        *********************

THIS ROUTINE CONVERTS THE CONTENTS OF CHECK, WHICH
                           CONTAINS A NUMBER OF TIMER COUNTS CORRESPONDING TO
                           A DELAY ANGLE TO THE BINARY REPRESENTATION OF THAT
                           DELAY ANGLE.

0151 2A0280    176 ITSELF: LHLD    CHECK
0154 7D        177        MOV     A,L              ;DIVIDE CHECK BY 040H TO
0155 17        178        RAL                      ;OBTAIN BINARY DISPLAY OF INTEGER
0156 6F        179        MOV     L,A              ;PORTION OF THE DELAY ANGLE
0157 7C        180        MOV     A,H              ;PUSH UPPER TWO BITS OF L TO
0158 17        181        RAL                      ;TWO LOWER BITS OF H
0159 67        182        MOV     H,A
015A 7D        183        MOV     A,L
015B 17        184        RAL
015C 6F        185        MOV     L,A
015D 7C        186        MOV     A,H
015E 17        187        RAL                      ;RESULT IN H REGISTER
015F 2F        188        CMA                      ;SUBTRACT RESULT FROM 180 DEGREES
0160 3C        189        INR     A                ;TO OBTAIN CORRECT REPRESENTATION
0161 C6B4      190        ADI     0B4H
0163 47        191        MOV     B,A
0164 0E0A      192        MVI     C,WRP2           ;OUTPUT DELAY ANGLE
0166 CDE604    193        CALL    WRLED
0169 76        194        HLT                      ;WAIT FOR INTERUPT
016A C35101    195        JMP     ITSELF

LOC  OBJ      LINE       SOURCE STATEMENT

*********************
                                          INTERRUPT PROGRAM
                                        *********************

016D E5        205 SERVE: PUSH    H                ;SAVE ALL THE REGISTERS OF THE USER PROGRAM
016E D5        206        PUSH    D
016F C5        207        PUSH    B
0170 F5        208        PUSH    PSW
0171 3E00      209        MVI     A,00H            ;LATCH THE CONTENTS OF THE INTERRUPT TIMER
0173 D3E3      210        OUT     T@CSR            ; ...SO THAT THE PROPER INTERRUPT LATENCY
               211                                 ; ...CORRECTION SUBROUTINE IS ACTIVATED.
0175 DBE0      212        IN      T@DB0            ;READ THE LOWER BYTE OF THE INTERRUPT
0177 2F        213        CMA
0178 3C        214        INR     A
0179 C6D4      215        ADI     0D4H
017B E60F      216        ANI     0FH              ; ...TIMER AND MASK OFF THE UPPER 4 BITS.
017D 07        217        RLC                      ;MULTIPLY THE LOW 4 BITS BY 16.
017E 07        218        RLC
017F 07        219        RLC
0180 07        220        RLC
0181 6F        221        MOV     L,A
0182 2604      222        MVI     H,PAGE?D         ;JUMP TO ONE OF TEN SUBROUTINES WHICH
0184 E9        223        PCHL                     ; ...ACTS TO SYNCHRONIZE THE CODE AT "NUM".
               224                                 ;
0185 DBE0      225 NUM:   IN      T@DB0            ;READ THE HIGH-BYTE OF THE
               226                                 ; ...INTERRUPT TIMER ONLY BECAUSE IT IS NECESSARY.
0187 0E09      227        MVI     C,WRP1           ;LOAD THE ACCUMULATOR WITH THE NEXT THYRISTOR
0189 CDDF04    228        CALL    WRCMD            ; ...FIRING SEQUENCE AND FIRE.
018C CDDE01    229        CALL    RALPHA           ;READ THE CONTROL VARIABLE, "RALPHA".
018F 3E00      230        MVI     A,00H            ;LATCH THE INTERRUPT TIMER OVERLAP VALUE
0191 D3E3      231        OUT     T@CSR            ; ...AND USE THIS TO CALCULATE THE TIME
               232                                 ; ...INTERVAL X IN [FIGURE 1].
0193 DBE0      233        IN      T@DB0            ;READ BOTH BYTES OF THE
0195 6F        234        MOV     L,A              ; ...INTERRUPT TIMER AND STORE THIS VALUE
0196 DBE0      235        IN      T@DB0            ; ...IN "SAVE".
0198 67        236        MOV     H,A
0199 220680    237        SHLD    SAVE
019C CDC401    238        CALL    RSTAR            ;READ THE PRESENT VALUE OF R*
019F 2A0480    239        LHLD    RI               ;JUMP TO THE SUBROUTINE WHICH CORRESPONDS
01A2 E9        240        PCHL                     ; ...TO THE NEXT FIRING SEQUENCE SO THAT THE
               241                                 ; ...PARAMETER Y CAN BE CALCULATED.
01A3 2A0680    242 BACK:  LHLD    SAVE             ;LOAD <H,L> WITH THE PREVIOUS
               243                                 ; ...VALUE OF THE INTERRUPT TIMER.
01A6 3E00      244        MVI     A,00H            ;LATCH THE CONTENTS OF THE INTERRUPT TIMER
01A8 D3E3      245        OUT     T@CSR            ; ...AGAIN TO DETERMINE THE # OF COUNTS
               246                                 ; ...SINCE THE TIMER WAS LAST LATCHED.
01AA DBE0      247        IN      T@DB0            ;BRING IN THE TIMER VALUE AND SUBTRACT
01AC 95        248        SUB     L                ; ...THE PREVIOUS INTERRUPT TIMER  VALUE .
01AD 4F        249        MOV     C,A
01AE DBE0      250        IN      T@DB0
01B0 9C        251        SBB     H                ;THIS RESULT IS STORED IN <B,C>.
01B1 47        252        MOV     B,A              ; ...REPRESENTS A NEGATIVE X IN [FIGURE 5].
01B2 E1        253        POP     H                ;RECALL THE Y VALUE OBTAINED VIA "RI" CALL.
01B3 09        254        DAD     B                ;SUBTRACT X FROM Y.
01B4 01E8FE    255        LXI     B,0FEE8H         ;LOAD <B,C> WITH THE CONSTANT
               256                                 ; ...-[ B+C-A].
01B7 09        257        DAD     B                ;ADD THE CONSTANT TO THE RESULT OF Y-X.
               258                                 ; ...THIS YIELDS THE NEXT INTERRUPT TIMING.
```

```
01B8 7D        259           MOV    A,L              ;LOAD THE INTERRUPT TIMER WITH THE CORRECT
01B9 D3E0      260           OUT    T@DB0            ; ...TIME BEFORE NEXT FIRING.
01BB 7C        261           MOV    A,H
01BC D3E0      262           OUT    T@DB0
               263           ;
01BE F1        264           POP    PSW              ;RESTORE REGISTERS.
01BF C1        265           POP    B
01C0 D1        266           POP    D
01C1 E1        267           POP    H
01C2 FB        268           EI                      ;RE-ENABLE THE RST 7.5 INTERRUPT
01C3 C9        269           RET                     ; ...AND RETURN FROM INTERRUPT.
               270 ;
               271 ;
               272 ;         *****************
               273 ;
               274 ;                  R* SUBROUTINE
               275 ;
               276 ;         *****************
               277 ;
               278 ;
               279 ;
01C4 3E40      280  RSTAR:   MVI    A,40H            ;LATCH RAMP R*'S (R4-RAMP) PRESENT VALUE.
01C6 D3E3      281           OUT    T@CSR
01C8 DBE1      282           IN     T@DB1
01CA 6F        283           MOV    L,A
01CB DBE1      284           IN     T@DB1
01CD 67        285           MOV    H,A
01CE E5        286           PUSH   H                ;SAVE THE NEW VALUE OF R* ON THE STACK
               287                                   ; ...UNTIL IT CAN BE CHECKED.
01CF 0100A6    288           LXI    B,-TIM360        ;HAS THE R* TIMER WRAPPED-AROUND ?
01D2 09        289           DAD    B
01D3 E1        290           POP    H
01D4 D2DA01    291           JNC    DONE
01D7 210000    292           LXI    H,0              ; ...IF SO, FORCE THE TIMER VALUE TO ZERO.
01DA 220880    293  DONE:    SHLD   R?STAR           ;STORE THE R* TIMER VALUE.
01DD C9        294           RET
               295 ;
               296 ;         *****************
               297 ;
               298 ;                R-ALPHA SUBROUTINE
               299 ;
               300 ;         *****************
               301 ;
01DE 2101F7    302  RALPHA:  LXI    H,FCR            ;POINT HL TO FIRST CHANNEL REGISTER OF 732
01E1 3606      303           MVI    M,GACHAN         ;LOAD CHANNEL
01E3 2B        304           DCX    H                ;POINT TO COMMAND/STATUS REGISTER
01E4 3601      305           MVI    M,01H            ;START A/D CONVERSION
01E6 7E        306  WAIT:    MOV    A,M              ;READ STATUS
01E7 07        307           RLC                     ;CHECK EOC STATUS
01E8 D2E601    308           JNC    WAIT             ;JUMP IF CONVERSION NOT DONE
01EB 3600      309           MVI    M,00H            ;RESET CONVERSION ENABLE IN COMMAND REGISTER
01ED 2A04F7    310           LHLD   ADDATA           ;LOAD CONVERTER DATA INTO HL
01F0 7D        311           MOV    A,L
01F1 E6F0      312           ANI    0F0H             ;LOWER FOUR BITS OF LOWER BYTE SHOULD BE ZERO
01F3 37        313           STC
01F4 3F        314           CMC
01F5 6F        315           MOV    L,A              ;BEGIN SCALING-RESULT SHOULD OCCUPY
01F6 7C        316           MOV    A,H              ;LOWER 12 BITS OF HL REGISTER INSTEAD
01F7 1F        317           RAR                     ;OF UPPER 12 BITS SO ROTATE RIGHT
01F8 67        318           MOV    H,A              ;DO THIS 3 TIMES INSTEAD OF 4 SO RESULT
01F9 7D        319           MOV    A,L              ;IS EFFECTIVELY MULTIPLIED BY TWO.
01FA 1F        320           RAR
01FB 6F        321           MOV    L,A
01FC 7C        322           MOV    A,H
01FD 1F        323           RAR
01FE 67        324           MOV    H,A
01FF 7D        325           MOV    A,L
0200 1F        326           RAR
0201 6F        327           MOV    L,A
0202 7C        328           MOV    A,H
0203 1F        329           RAR
0204 67        330           MOV    H,A
0205 7D        331           MOV    A,L
0206 1F        332           RAR
0207 6F        333           MOV    L,A
0208 118106    334           LXI    D,REFER
020B 19        335           DAD    D                ;ADD 681H TO COMPLETE SCALING.
020C E5        336           PUSH   H                ;SAVE THE REVISED VALUE OF RALPHA.
020D 117FDA    337           LXI    D,-(TIM150+1)    ;DOES THIS VALUE CORRESPOND
0210 19        338           DAD    D                ; ...TO ANGLE .LT. 30 DEGREES ?
0211 D21B02    339           JNC    CHIGH            ; (IF SO, CARRY IS SET)
0214 118025    340           LXI    D,TIM150         ;FORCE THE ANGLE TO 30 DEGREES.
0217 E1        341           POP    H                ; (CLEAN UP STACK).
0218 C32802    342           JMP    OK               ;IF THE ANGLE .LE. 30 DEGREES THERE
               343                                   ; ...IS NO NEED TO TEST ANGLE .GT. 150 DEGREES.
021B E1        344  CHIGH:   POP    H                ;RETRIEVE RALPHA AND SAVE IN <D,E>.
021C 5D        345           MOV    E,L
021D 54        346           MOV    D,H
021E 0180F8    347           LXI    B,-TIM030        ;DOES THE VALUE OF RALPHA CORRESPOND TO
               348                                   ; ...ANGLE .GT. 150 DEGREES ?
0221 09        349           DAD    B
0222 DA2802    350           JC     OK               ; (IF CARRY SET, ANGLE IS OK)
0225 118007    351           LXI    D,TIM030         ; LIMIT ANGLE TO 150 DEGREES.
0228 2A0280    352  OK:      LHLD   CHECK            ;LOAD <H,L> WITH PREVIOUS FIRING ANGLE VALUE.
022B 7B        353           MOV    A,E              ;DETERMINE WHICH IS LARGER:
022C 95        354           SUB    L                ; ...THE OLD OR NEW FIRING ANGLE.
022D 6F        355           MOV    L,A
```

```
022E 7A        356          MOV    A,D              ;DO TEST BY SUBTRACTING OLD FROM NEW.
022F 9C        357          SBB    H                ;IF CARRY, THEN
0230 67        358          MOV    H,A              ; ...RALPHA_OLD .GT. RALPHA_NEW.
0231 D24702    359          JNC    TOOLG            ;THUS, OLD ANGLE .LT. NEW ANGLE.
               360                                  ; (FALL-THRU IF CARRY)
0234 010005    361          LXI    B, TIM020        ;THE VALUE IN <H,L> REPRESENTS
0237 09        362          DAD    B                ; ...A NEGATIVE ANGLE IN THE RANGE
0238 DA5A02    363          JC     OUT1             ; ...(0,-20) DEGREES.
               364                                  ; (FALL THRU IF NOT)
               365                                  ;THE NEW ANGLE
               366                                  ; ...CORRESPONDING TO RALPHA IS MORE THAN
               367                                  ; ...20 DEGREES LARGER THAN THE OLD ANGLE.
023B 2A0280    368          LHLD   CHECK            ;ALSO, IF NO CARRY OCCURRED FROM THE PREVIOUS
023E 0100FB    369          LXI    B, -TIM020       ; ...OPERATION, LOAD THE PREVIOUS VALUE OF RALPHA
0241 09        370          DAD    B                ; ...FROM "CHECK" AND ADD 20 DEGREES.
0242 54        371          MOV    D,H              ;STORE THIS VALUE IN <D,E>.
0243 5D        372          MOV    E,L
0244 C35C02    373          JMP    OUT2
0247 0100FB    374 TOOLG:   LXI    B, -TIM020       ;IF NO CARRY OCCURRED WHEN RALPHA_OLD
024A 09        375          DAD    B                ; ...WAS SUBTRACTED FROM RALPHA_NEW
024B D25A02    376          JNC    OUT1             ; ...THIS MEANS THAT ANGLE(RALPHA_NEW)
               377                                  ; ...IS ACTUALLY SMALLER THAN
               378                                  ; ...ANGLE(RALPHA_OLD).
               379                                  ;HOWEVER, THE RESULT IN <H,L>
               380                                  ; ...SUBTRACTION: RALPHA_NEW - RALPHA_OLD
               381                                  ; ...SHOULD BE IN RANGE (0, -TIM020) IF
               382                                  ; ...RALPHA_NEW IS OK.
               383                                  ;THEREFORE, I CAN ADD TO TEST THE RANGE
               384                                  ; ...OF RALPHA_NEW.
               385                                  ; ...IF RALPHA_NEW IS OK.
               386                                  ; ANGLE(RALPHA_NEW)
               387                                  ; ...IS MORE THAN 20 DEGREES LESS
               388                                  ; ...THAN ANGLE(RALPHA_OLD).
024E 2A0280    389          LHLD   CHECK            ;IF
               390                                  ;      ANGLE(RALPHA) .LE.
               391                                  ;            ANGLE(RALPHA_OLD) - (20 DEGREES)
0251 010005    392          LXI    B,TIM020         ; ...THEN SET
               393                                  ;      RALPHA_NEW = RALPHA_OLD - (20 DEGREES).
0254 09        394          DAD    B
0255 54        395          MOV    D,H              ;STORE THE RESULT IN <D,E>.
0256 5D        396          MOV    E,L
0257 C35C02    397          JMP    OUT2
025A 62        398 OUT1:    MOV    H,D              ;LOAD THE NEW VALUE INTO "CHECK".
025B 6B        399          MOV    L,E
025C 220280    400 OUT2:    SHLD   CHECK
025F C9        401 NOC:     RET
               402 ;
               403 ;                    *****************
               404 ;
               405 ;                       R1 SUBROUTINE
               406 ;
               407 ;                    *****************
               408 ;
               409 ;
               410 ;
0260 2A0880    411 R1:      LHLD   R?STAR
0263 0100F1    412          LXI    B,-TIM060        ;IS R* .LT. 60 DEGREES ?
0266 09        413          DAD    B
0267 DA7702    414          JC     UP               ;JUMP TO CHECK IF R* IS .GE. 240 DEGREES
               415                                  ; (FALL THRU IF NO CARRY)
               416                                  ;NOW, R* IS IN PROPER RANGE.
026A 2A0880    417          LHLD   R?STAR           ;PREPARE TO COMPUTE Y VALUE IN [FIGURE 5]
026D 01005A    418          LXI    B,TIM360         ; ...BY ADDING (360 DEGREES) TO R*.
0270 09        419          DAD    B
0271 220880    420          SHLD   R?STAR
0274 C38102    421          JMP    CAL              ;COMPUTE PARAMETER Y IN [FIGURE 5].
               422                                  ;
0277 2A0880    423 UP:      LHLD   R?STAR           ;IS R* .GE. 240 DEGREES ?
027A 0100C4    424          LXI    B,-TIM240
027D 09        425          DAD    B
027E D4B404    426          CNC    OOO              ; ...IF NOT, "OUT-OF-ORDER".
0281 21002D    427 CAL:     LXI    H,TIM180         ;EQUATION: R*_NEW=RALPHA+ (180 DEGREES).
0284 19        428          DAD    D                ; ...R*_NEW IS EXPECTED TIMER_1 VALUE WHEN
0285 54        429          MOV    D,H              ; ...THE NEXT SET OF THYRISTORS IS FIRED.
0286 5D        430          MOV    E,L              ; ...<D,E> CONTAINS RALPHA.
0287 2A0880    431          LHLD   R?STAR
028A 7D        432          MOV    A,L              ;SUBTRACT: Y = R*-R*_NEW.
028B 93        433          SUB    E
028C 6F        434          MOV    L,A
028D 7C        435          MOV    A,H
028E 9A        436          SBB    D
028F 67        437          MOV    H,A
0290 E5        438          PUSH   H                ;STORE Y ON THE STACK.
0291 219F02    439          LXI    H,R2
0294 220480    440          SHLD   RI               ;SET POINTER TO NEXT RAMP-ROUTINE.
0297 3E21      441          MVI    A,FIRE@1         ;LOAD SEQ WITH THE NEXT THYRISTOR FIRING
0299 320080    442          STA    SEQ              ;SEQUENCE.
029C C3A301    443          JMP    BACK
               444 ;
               445 ;                    *****************
               446 ;
               447 ;                       R2 SUBROUTINE
               448 ;
               449 ;                    *****************
               450 ;
               451 ;
```

```
                    452 ;
029F 2A0880         453 R2:    LHLD    R?STAR
02A2 0100D3         454        LXI     B,-TIM180        ;IS R* .GE. 180 DEGREES ?
02A5 09             455        DAD     B
02A6 D4B404         456        CNC     OOO              ; ...IF NOT, "OUT-OF-ORDER".
02A9 21001E         457        LXI     H,TIM120         ;EQUATION:  R*_NEW=RALPHA+(120 DEGREES).
02AC 19             458        DAD     D                ;R*_NEW IS THE VALUE TIMER_1 SHOULD HAVE
02AD 54             459        MOV     D,H              ;WHEN THE NEXT SET OF THYRISTORS ARE FIRED.
02AE 5D             460        MOV     E,L              ;<D,E> CONTAINS RALPHA.
02AF 2A0880         461        LHLD    R?STAR
02B2 7D             462        MOV     A,L              ;SUBTRACT: Y = R*-R*_NEW.
02B3 93             463        SUB     E
02B4 6F             464        MOV     L,A
02B5 7C             465        MOV     A,H
02B6 9A             466        SBB     D
02B7 67             467        MOV     H,A
02B8 E5             468        PUSH    H                ;STORE Y ON THE STACK.
02B9 21C702         469        LXI     H,R3             ;SET POINTER TO NEXT SERVICE ROUTINE.
02BC 220480         470        SHLD    RI
02BF 3E30           471        MVI     A,FIRE@2         ;LOAD SEQ WITH THE NEXT THYRISTOR FIRING
02C1 320080         472        STA     SEQ              ;SEQUENCE.
02C4 C3A301         473        JMP     BACK
                    474 ;
                    475 ;
                    476 ;                     *****************
                    477 ;
                    478 ;                        R3 SUBROUTINE
                    479 ;
                    480 ;                     *****************
                    481 ;
                    482 ;
02C7 2A0880         483 R3:    LHLD    R?STAR
02CA 0100E2         484        LXI     B,-TIM120        ;IS R* .GE. 120 DEGREES ?
02CD 09             485        DAD     B
02CE D4B404         486        CNC     OOO              ; ...IF NOT, "OUT-OF-ORDER".
02D1 2A0880         487        LHLD    R?STAR
02D4 01FFB4         488        LXI     B,-(TIM300+1)    ; IS R* .LE. 300 DEGREES ?
02D7 09             489        DAD     B
02D8 DCB404         490        CC      OOO              ; ...IF NOT, "OUT-OF-ORDER".
02DB 21000F         491        LXI     H,TIM060         ;EQUATION:  R*_NEW = RALPHA + (60 DEGREES).
02DE 19             492        DAD     D                ; ...R*_NEW IS THE VALUE TIMER_1 SHOULD HAVE
02DF 54             493        MOV     D,H              ; ...WHEN THE NEXT SET OF THYRISTORS ARE FIRED.
02E0 5D             494        MOV     E,L              ;<D,E> CONTAINS RALPHA.
02E1 2A0880         495        LHLD    R?STAR
02E4 7D             496        MOV     A,L              ;SUBTRACT: Y = R*-R*_NEW.
02E5 93             497        SUB     E
02E6 6F             498        MOV     L,A
02E7 7C             499        MOV     A,H
02E8 9A             500        SBB     D
02E9 67             501        MOV     H,A
02EA E5             502        PUSH    H                ;STORE Y ON THE STACK.
02EB 21F902         503        LXI     H,R4             ;SET POINTER TO NEXT SERVICE ROUTINE.
02EE 220480         504        SHLD    RI
02F1 3E18           505        MVI     A,FIRE@3
02F3 320080         506        STA     SEQ              ;LOAD SEQ WITH NEXT THYRISTOR FIRING SEQUENCE.
02F6 C3A301         507        JMP     BACK
                    508 ;

509 ;
                    510 ;                     *****************
                    511 ;
                    512 ;                        R4 SUBROUTINE
                    513 ;
                    514 ;                     *****************
                    515 ;
                    516 ;
02F9 2A0880         517 R4:    LHLD    R?STAR
02FC 0100F1         518        LXI     B,-TIM060        ;IS  R* .GE. 60 DEGREES ?
02FF 09             519        DAD     B
0300 D4B404         520        CNC     OOO              ; ...IF NOT, "OUT-OF-ORDER".
0303 2A0880         521        LHLD    R?STAR
0306 01FFC3         522        LXI     B,-(TIM240+1)    ;IS R* .LE. 240 DEGREES ?
0309 09             523        DAD     B
030A DCB404         524        CC      OOO              ; ...IF NOT, "OUT-OF-ORDER".
030D 2A0880         525        LHLD    R?STAR           ;EQUATION:  R*_NEW=RALPHA.
0310 7D             526        MOV     A,L              ;SUBTRACT: Y = R*-R*_NEW.
0311 93             527        SUB     E
0312 6F             528        MOV     L,A
0313 7C             529        MOV     A,H
0314 9A             530        SBB     D
0315 67             531        MOV     H,A
0316 E5             532        PUSH    H                ;STORE Y ON THE STACK.
0317 212503         533        LXI     H,R5             ;SET POINTER TO NEXT SERVICE ROUTINE.
031A 220480         534        SHLD    RI
031D 3E0C           535        MVI     A,FIRE@4         ;LOAD SEQ WITH NEXT THYRISTOR FIRING SEQUENCE.
031F 320080         536        STA     SEQ
0322 C3A301         537        JMP     BACK
                    538 ;
                    539 ;                     *****************
                    540 ;
                    541 ;                        R5 SUBROUTINE
                    542 ;
                    543 ;                     *****************
                    544 ;
                    545 ;
                    546 ;
0325 2A0880         547 R5:    LHLD    R?STAR
```

```
0328 01FFD2      548         LXI     B,-(TIM180+1)   ;IS  R* .LE. 180 DEGREES ?
032B 09          549         DAD     B
032C DCB404      550         CC      OOO             ; ...IF NOT, "OUT-OF-ORDER".
032F 2100F1      551         LXI     H,-TIM060       ;EQUATION:  R*_NEW=RALPHA - (60 DEGREES).
0332 19          552         DAD     D               ; ...R*_NEW IS THE VALUE TIMER_1 SHOULD HAVE
0333 DA4C03      553         JC      GOOD            ; ...WHEN THE NEXT SET OF THYRISTORS ARE FIRED.
                 554                                 ; ...<D,E> CONTAINS RALPHA.  IF A
                 555                                 ; ...CARRY OCCURS R* IS IN THE PROPER RANGE.
                 556                                 ;IF NO CARRY OCCURRED THE NEW R* IS DENOTED
                 557                                 ; ...BY THE FOLLOWING EQUATION.
0336 21004B      558         LXI     H,TIM300        ;EQUATION:  R*_NEW=RALPHA+(300 DEGREES).
0339 19          559         DAD     D               ;R*_NEW IS THE VALUE TIMER_1 SHOULD HAVE
033A 54          560         MOV     D,H             ; ...WHEN THE NEXT SET OF THYRISTORS ARE FIRED.
033B 5D          561         MOV     E,L
033C 2A0880      562         LHLD    R?STAR          ;ADD (360 DEGREES) TO THE MOST RECENT R*
033F 01005A      563         LXI     B,TIM360        ; ...SO THAT WHEN R*_NEW IS SUBTRACTED FROM THE
0342 09          564         DAD     B               ; ...RECENT VALUE THE RESULT WILL REPRESENT Y
0343 7D          565         MOV     A,L             ; ...IN [FIGURE 5].
0344 93          566         SUB     E               ;SUBTRACT: Y = R*+(360 DEGREES)-R*_NEW.
0345 6F          567         MOV     L,A
0346 7C          568         MOV     A,H
0347 9A          569         SBB     D
0348 67          570         MOV     H,A
0349 C35703      571         JMP     OVER            ;JUMP TO FINISHING LOCATIONS.
034C 54          572 GOOD:   MOV     D,H             ;SAVE THE RESULT OF R*_NEW IN <D,E>.
034D 5D          573         MOV     E,L
034E 2A0880      574         LHLD    R?STAR          ;SUBTRACT:  R*-R*_NEW=Y.
0351 7D          575         MOV     A,L
0352 93          576         SUB     E
0353 6F          577         MOV     L,A
0354 7C          578         MOV     A,H
0355 9A          579         SBB     D
0356 67          580         MOV     H,A
0357 E5          581 OVER:   PUSH    H               ;STORE Y ON THE STACK.
0358 216603      582         LXI     H,R6            ;SET POINTER TO NEXT SERVICE ROUTINE.
035B 220480      583         SHLD    RI
035E 3E06        584         MVI     A,FIRE@5        ;LOAD SEQ WITH THE NEXT THYRISTOR FIRING
0360 320080      585         STA     SEQ             ;SEQUENCE.
0363 C3A301      586         JMP     BACK
                 587 ;
                 588 ;
                 589 ;                               *****************
                 590 ;
                 591 ;                                  R6 SUBROUTINE
                 592 ;
                 593 ;                               *****************
                 594 ;
                 595 ;
                 596 ;
0366 2A0880      597 R6:     LHLD    R?STAR
0369 0100B5      598         LXI     B,-TIM300       ;IS  R* .GE. TIM300 ?
036C 09          599         DAD     B               ; ...IF SO, DO CALCULATION.
036D DA8B03      600         JC      CALC
0370 2A0880      601         LHLD    R?STAR          ;IS  R* .LE. 120 DEGREES ?
0373 01FFE1      602         LXI     B,-(TIM120+1)
0376 09          603         DAD     B
0377 DCB404      604         CC      OOO             ; ...IF NOT, "OUT-OF-ORDER".
037A 2100E2      605         LXI     H,-TIM120       ;VERIFY EQUATION:  R*_NEW=RALPHA-(120 DEGREES)
037D 19          606         DAD     D               ; ...APPLIES.  IF IT APPLIES A CARRY WILL OCCUR.
037E DA9D03      607         JC      OTHER
0381 2A0880      608         LHLD    R?STAR          ;IF R* IS .LE. 120 DEGREES AND IF EQUATION
0384 01005A      609         LXI     B,TIM360        ; ...RALPHA-(120 DEGREES)=R*_NEW DOES NOT APPLY,
0387 09          610         DAD     B               ; ... (360 DEGREES) MUST BE ADDED ONTO R*
0388 220880      611         SHLD    R?STAR          ; ... SO THAT A PROPER VALUE FOR Y IS OBTAINED WHEN
                 612                                 ; ... R*_NEW IS SUBTRACTED FROM R*.
038B 21003C      613 CALC:   LXI     H,TIM240        ;EQUATION:  R*-R*_NEW=Y
038E 19          614         DAD     D               ;FIND THE VALUE OF THE PARAMETER Y.
038F 54          615         MOV     D,H
0390 5D          616         MOV     E,L
0391 2A0880      617         LHLD    R?STAR          ;SUBTRACT:  R*-R*_NEW=Y.
0394 7D          618         MOV     A,L
0395 93          619         SUB     E
0396 6F          620         MOV     L,A
0397 7C          621         MOV     A,H
0398 9A          622         SBB     D
0399 67          623         MOV     H,A
039A C3A803      624         JMP     LOAD            ;THE VALUE OF THE PARAMETER HAS NOW BEEN
                 625                                 ; ...OBTAINED SO LOAD THE PROPER MEMORY LOCATIONS
                 626                                 ; ...AND PREPARE TO EXIT THE PROGRAM.
039D 54          627 OTHER:  MOV     D,H             ;THIS PORTION OF THE PROGRAM TAKES CARE OF
039E 5D          628         MOV     E,L             ; ...R*_NEW=RALPHA-(120 DEGREES).
039F 2A0880      629         LHLD    R?STAR
03A2 7D          630         MOV     A,L             ;SUBTRACT:  R*-R*_NEW=Y.
03A3 93          631         SUB     E
03A4 6F          632         MOV     L,A
03A5 7C          633         MOV     A,H
03A6 9A          634         SBB     D
03A7 67          635         MOV     H,A
03A8 E5          636 LOAD:   PUSH    H               ;SAVE THE Y PARAMETER ON THE STACK.
03A9 216002      637         LXI     H,R1            ;SET POINTER TO NEXT SERVICE ROUTINE.
03AC 220480      638         SHLD    RI
03AF 3E03        639         MVI     A,FIRE@6        ;LOAD "SEQ" WITH THE NEXT
03B1 320080      640         STA     SEQ             ; ...THYRISTOR FIRING SEQUENCE.
03B4 C3A301      641         JMP     BACK
                 642 ;
```

```
                        643 ;                    ************************
                        644 ;
                        645 ;                        DELAY SUBROUTINES
                        646 ;
                        647 ;                    ************************
                        648 ;
                        649 ;
0400                    650 ;
                        651         ORG     0400H
                        652 ;
0400 3E00               653 D24:    MVI     A,00H           ;DELAY   (D4H)
0402 3E00               654         MVI     A,00H
0404 13                 655         INX     D
0405 00                 656         NOP
0406 00                 657         NOP
0407 218501             658         LXI     H,NUM
040A E9                 659         PCHL
                        660 ;
0410                    661         ORG     0410H
                        662 ;
0410 3E00               663 D22:    MVI     A,00H           ;DELAY FOR 22 STATES (D3)
0412 3E00               664         MVI     A,00H
0414 00                 665         NOP
0415 00                 666         NOP
0416 218501             667         LXI     H,NUM
0419 E9                 668         PCHL
                        669 ;
0420                    670         ORG     0420H
                        671 ;
0420 3E00               672 D20:    MVI     A,00H           ;DELAY FOR 20 STATES (D2)
0422 3E00               673         MVI     A,00H
0424 13                 674         INX     D
0425 218501             675         LXI     H,NUM
0428 E9                 676         PCHL
                        677 ;
0430                    678         ORG     0430H
                        679 ;
0430 3E00               680 D18:    MVI     A,00H           ;DELAY FOR 18 STATES (D1)
0432 3E00               681         MVI     A,00H
0434 00                 682         NOP
0435 218501             683         LXI     H,NUM
0438 E9                 684         PCHL
                        685 ;
0440                    686         ORG     0440H
                        687 ;
0440 110000             688 D16:    LXI     D,0             ;DELAY FOR 16 STATES (D0)
0443 13                 689         INX     D
0444 218501             690         LXI     H,NUM
0447 E9                 691         PCHL
                        692 ;
0450                    693         ORG     0450H
                        694 ;
0450 3E00               695 D14:    MVI     A,00H           ;DELAY FOR 14 STATES (CF)
0452 3E00               696         MVI     A,00H
0454 218501             697         LXI     H,NUM
0457 E9                 698         PCHL
                        699 ;
0460                    700         ORG     0460H
                        701 ;
0460 13                 702 D12:    INX     D               ;DELAY FOR 12 STATES (CE)
0461 13                 703         INX     D
0462 218501             704         LXI     H,NUM
0465 E9                 705         PCHL
                        706 ;
0470                    707         ORG     0470H
                        708 ;
0470 C37304             709 D10:    JMP     ONE             ;DELAY FOR 10 STATES (CD)
0473 218501             710 ONE:    LXI     H,NUM
0476 E9                 711         PCHL
                        712 ;
0480                    713         ORG     0480H
                        714 ;
0480 00                 715 D8:     NOP                     ;DELAY FOR 8 STATES (CC)
0481 00                 716         NOP
0482 218501             717         LXI     H,NUM
0485 E9                 718         PCHL
                        719 ;
0490                    720         ORG     0490H
                        721 ;
0490 13                 722 D6:     INX     D               ;DELAY FOR 6 STATES (CB)
0491 218501             723         LXI     H,NUM
0494 E9                 724         PCHL
                        725 ;
04A0                    726         ORG     04A0H
                        727 ;
04A0 00                 728 D4:     NOP                     ;DELAY FOR 4 STATES (CA)
04A1 218501             729         LXI     H,NUM
04A4 E9                 730         PCHL
                        731 ;
04B0                    732         ORG     04B0H
                        733 ;
04B0 218501             734 D2:     LXI     H,NUM           ;DELAY   (C9)
04B3 E9                 735         PCHL
                        736 ;
                        737 ;
```

```
                            738 ;                         *******************
                            739 ;
                            740 ;                                I/O PROGRAMS
                            741 ;
                            742 ;                         *******************
                            743 ;
                            744 ;
                            745 ;           OUT-OF-ORDER (ERROR EXIT)
                            746 ;
04B4 0E0A                   747 OOO:   MVI     C,WRP2          ;OUTPUT TO PORT 2
04B6 06FF                   748        MVI     B,0FFH          ;ALL LEDS ON IF OUT OF ORDER EXIT ENCOUNTERED
04B8 CDE604                 749        CALL    WRLED
04BB 76                     750        HLT                     ;HALT EXECUTION
                            751 ;
                            752                                ;941 I/O ROUTINES
04BC DBE5                   753 SNDCMD: IN     IDPS            ;WAIT TILL IBF=0
04BE E602                   754        ANI     IBF
04C0 C2BC04                 755        JNZ     SNDCMD
04C3 79                     756        MOV     A,C             ;LOAD COMMAND
04C4 D3E5                   757        OUT     IDPC
04C6 C9                     758        RET
04C7 DBE5                   759 SNDDAT: IN     IDPS            ;WAIT TILL IBF=0
04C9 E602                   760        ANI     IBF
04CB C2C704                 761        JNZ     SNDDAT
04CE 3A0080                 762        LDA     SEQ             ;LOAD PARAMETER (FIRING WORD)
04D1 D3E4                   763        OUT     IDPD
04D3 C9                     764        RET
04D4 DBE5                   765 SNDLED: IN     IDPS            ;WAIT TILL IBF=0
04D6 E602                   766        ANI     IBF
04D8 C2D404                 767        JNZ     SNDLED
04DB 78                     768        MOV     A,B             ;LOAD PARAMETER (BINARY REP. OF DELAY ANGLE)
04DC D3E4                   769        OUT     IDPD
04DE C9                     770        RET
04DF CDBC04                 771 WRCMD:  CALL   SNDCMD           ;USED FOR FIRING WORD
04E2 CDC704                 772        CALL    SNDDAT
04E5 C9                     773        RET
04E6 CDBC04                 774 WRLED:  CALL   SNDCMD           ;USED FOR DELAY ANGLE I/O
04E9 CDD404                 775        CALL    SNDLED
04EC C9                     776        RET
                            777 ;
                            778 ;                         ********************
                            779 ;
                            780 ;                              INTERUPT SERVICE
                            781 ;
                            782 ;                         ********************
                            783 ;
04ED FB                     784 INTER:  EI                      ;CLEAR INTERUPT AND RETURN
04EE C9                     785        RET
                            786 ;
                            787 ; DATA STORAGE
8000                        788        ORG    8000H
8000                        789 SEQ:   DS      2                ;START OF 569 RAM
8002                        790 CHECK: DS      2                ; FIRING SEQUENCE INDEX
8004                        791 RI:    DS      2                ; OLD VALUE OF RALPHA
8006                        792 SAVE:  DS      2                ; POINTER TO INTERRUPT SERVICE ROUTINE.
8008                        793 R?STAR: DS     2                ; MOST RECENT R* VALUE
800A                        794 TEST:  DS      2                ; R* VALUE
                            795                                 ; RALPHA VALUE
                            796        END                      ;<END> OF CTL.ASM
```

PUBLIC SYMBOLS

EXTERNAL SYMBOLS

USER SYMBOLS

| | | | | | | | |
|---|---|---|---|---|---|---|---|
| ADDATA A F704 | AGAIN A 013A | BACK A 01A3 | BASE A F700 | BEGIN A 0000 | CAL A 0281 | CALC A 038B | |
| CHECK A 8002 | CHIGH A 021B | D10 A 0470 | D12 A 0460 | D14 A 0450 | D16 A 0440 | D18 A 0430 | |
| D2 A 04B0 | D20 A 0420 | D22 A 0410 | D24 A 0400 | D4 A 04A0 | D6 A 0490 | D8 A 0480 | |
| DONE A 01DA | FCR A F701 | FIRE@1 A 0021 | FIRE@2 A 0030 | FIRE@3 A 0018 | FIRE@4 A 000C | FIRE@5 A 0006 | |
| FIRE@6 A 0003 | GACHAN A 0006 | GOOD A 034C | IBF A 0002 | IDPC A 00E5 | IDPD A 00E4 | IDPS A 00E5 | |
| INTER A 04ED | INTM1 A 0040 | INTM7 A 0078 | ITSELF A 0151 | LOAD A 03A8 | MAIN A 0100 | NOC A 025F | |
| NUM A 0185 | OK A 0228 | ONE A 0473 | OOO A 04B4 | OTHER A 039D | OUT1 A 025A | OUT2 A 025C | |
| OVER A 0357 | PAGE?D A 0004 | R1 A 0260 | R2 A 029F | R3 A 02C7 | R4 A 02F9 | R5 A 0325 | |
| R6 A 0366 | R?STAR A 8008 | RALPHA A 01DE | REFER A 0681 | RI A 8004 | RST55 A 002C | RST65 A 0034 | |
| RST75 A 003C | RSTAR A 01C4 | SAVE A 8006 | SEQ A 8000 | SERVE A 016D | SNDCMD A 04BC | SNDDAT A 04C7 | |
| SNDLED A 04D4 | STKTOP A 87FF | T530 A 0050 | T531 A 0060 | T532 A 0070 | T@CSR A 00E3 | T@DB0 A 00E0 | |
| T@DB1 A 00E1 | T@DB2 A 00E2 | TEST A 800A | TIM010 A 0280 | TIM020 A 0500 | TIM030 A 0780 | TIM060 A 0F00 | |
| TIM090 A 1680 | TIM120 A 1E00 | TIM150 A 2580 | TIM180 A 2D00 | TIM240 A 3C00 | TIM300 A 4B00 | TIM360 A 5A00 | |
| TOOLG A 0247 | TRAP A 0024 | UP A 0277 | UPI0 A 0048 | UPI1 A 0058 | UPI2 A 0068 | WAIT A 01E6 | |
| WRCMD A 04DF | WRLED A 04E6 | WRP1 A 0009 | WRP2 A 000A | | | | |

ASSEMBLY COMPLETE.   NO ERRORS

I claim:

1. Thyristor gating apparatus for a microprocessor-based control system involving N thyristors connected to an AC power supply and to be fired sequentially; the apparatus including a ramp-intersect comparator having a ramp generator to provide a running count representing electrical angles therefrom on said AC power supply, said comparator being responsive (1) to a reference signal characterizing the instant of firing a thyristor "next" to be fired and (2) to said running count, to determine such firing instant; and means for firing said "next" thyristor upon said firing instant, characterized in that said ramp-intersect comparator includes:

an auxiliary counter;

a master counter serving as said ramp generator;

said microprocessor being responsive to said running count from said master counter and to said reference signal for deriving an error count;

said error count being derived by said microprocessor upon a selected instant;

and said microprocessor presetting said auxiliary counter with said error count instantaneously after the derivation thereof upon said selected instant; said auxiliary counter being immediately thereafter triggered by said microprocessor to count down from such preset error count;

said firing means being controlled for firing upon zero count by said auxiliary counter.

2. Thyristor gating apparatus according to claim 1 with said AC power supply having N phases; and said microprocessor upon said selected instant deriving from said running count a ramp count, displaced by $K \times \tau/N$ from said master counter running count, for a "next" thyristor of rank K in the sequence of thyristors; said microprocessor deriving said error count in relation to said reference signal and to said ramp count.

3. Thyristor gating apparatus according to claim 1, with said ramp count being derived with arithmetic logic means.

4. Thyristor gating apparatus according to claim 1 with said selected instant being right after firing of a thyristor.

* * * * *